(12) United States Patent
Weiner et al.

(10) Patent No.: US 11,731,676 B2
(45) Date of Patent: Aug. 22, 2023

(54) SYSTEMS AND METHODS FOR RAILWAY ASSET MANAGEMENT

(71) Applicant: Amsted Rail Company, Inc., Chicago, IL (US)

(72) Inventors: Evan Weiner, Chicago, IL (US); Brad A. Myers, Chicago, IL (US)

(73) Assignee: Amsted Rail Company, Inc., Chicago, IL (US)

( * ) Notice: Subject to any disclaimer, the term of this patent is extended or adjusted under 35 U.S.C. 154(b) by 0 days.

(21) Appl. No.: 17/837,677

(22) Filed: Jun. 10, 2022

(65) Prior Publication Data

US 2022/0388556 A1 Dec. 8, 2022

Related U.S. Application Data

(63) Continuation of application No. 17/715,636, filed on Apr. 7, 2022, now abandoned, which is a continuation
(Continued)

(51) Int. Cl.
*B61L 27/40* (2022.01)
*B61L 27/57* (2022.01)
(Continued)

(52) U.S. Cl.
CPC .............. *B61L 27/57* (2022.01); *B25J 9/1674* (2013.01); *B25J 9/1689* (2013.01); *B61L 27/40* (2022.01);
(Continued)

(58) Field of Classification Search
CPC ..... G06T 15/205; G06T 19/20; G06T 7/0004; G06T 19/006; G06T 2215/16; G06T 2207/20084; G06V 20/20; G06V 10/75; G06V 20/54; G07C 5/008; G07C 5/0808; G02B 27/0172; G02B 27/017;
(Continued)

(56) References Cited

U.S. PATENT DOCUMENTS 7,705,743 B2 4/2010 Barone et al.
9,694,834 B2 * 7/2017 Shubs, Jr. ............. G06F 3/0482
(Continued)

FOREIGN PATENT DOCUMENTS

| EP | 1655695 | 5/2006 |
|---|---|---|
| WO | 2020038706 | 2/2020 |
| WO | 2020191398 | 9/2020 |

OTHER PUBLICATIONS

Mcmahon et al., Requirements for Big Data Adoption for Railway Asset Management, 2020, IEEE, p. 15543-15564 (Year: 2020).*
(Continued)

*Primary Examiner* — Mcdieunel Marc
(74) *Attorney, Agent, or Firm* — Fox Rothschild LLP; Gary A. Hecht; Carol E. Thorstad-Forsyth

(57) ABSTRACT

Systems and methods for railway asset management. The methods comprise: using a virtual reality device to recognize and collect real world information about railway assets located in a railyard; and using the real world information to (i) associate a railway asset to a data collection unit, (ii) provide an individual with an augmented reality experience associated with the railyard and/or (iii) facilitate automated railyard management tasks.

18 Claims, 20 Drawing Sheets

Related U.S. Application Data of application No. 17/362,174, filed on Jun. 29, 2021, now Pat. No. 11,325,625.

(60) Provisional application No. 63/153,652, filed on Feb. 25, 2021, provisional application No. 63/048,871, filed on Jul. 7, 2020.

(51) Int. Cl.

| | | |
|---|---|---|
| *G07C 5/00* | (2006.01) | |
| *G07C 5/08* | (2006.01) | |
| *G06T 15/20* | (2011.01) | |
| *G06T 19/20* | (2011.01) | |
| *G06T 19/00* | (2011.01) | |
| *B25J 9/16* | (2006.01) | |
| *G02B 27/01* | (2006.01) | |
| *G06N 20/00* | (2019.01) | |
| *G06V 20/20* | (2022.01) | |
| *B61L 27/70* | (2022.01) | |

(52) U.S. Cl.
CPC .......... *B61L 27/70* (2022.01); *G02B 27/0172* (2013.01); *G06N 20/00* (2019.01); *G06T 15/205* (2013.01); *G06T 19/006* (2013.01); *G06T 19/20* (2013.01); *G06V 20/20* (2022.01); *G07C 5/008* (2013.01); *G07C 5/0808* (2013.01); *G02B 2027/0174* (2013.01); *G06T 2215/16* (2013.01)

(58) Field of Classification Search
CPC ............. G02B 2027/0174; G06N 20/00; B25J 9/1674; B25J 9/1689; B61L 27/57; B61L 27/70; B61L 25/04; B61L 25/025; B61L 27/40; B61L 2205/04; B61L 17/00
See application file for complete search history.

(56) References Cited

U.S. PATENT DOCUMENTS

| | | | |
|---|---|---|---|
| 9,710,720 B2* | 7/2017 | Mitti | G06V 20/63 |
| 9,711,046 B2* | 7/2017 | Shubs, Jr. | B61L 25/048 |
| 9,739,763 B2* | 8/2017 | Poling | G01N 33/2888 |
| 9,805,529 B2* | 10/2017 | Skonberg | G07C 9/28 |
| 9,841,494 B2* | 12/2017 | Meadow | G06Q 20/308 |
| 9,842,496 B1* | 12/2017 | Hayward | G05D 1/0214 |
| 9,996,551 B2* | 6/2018 | Bare | G02B 27/017 |
| 10,352,779 B2* | 7/2019 | Groeneweg | B61L 23/042 |
| 11,115,732 B2* | 9/2021 | Lucrecio | G08G 1/205 |
| 2017/0066459 A1 | 3/2017 | Singh | |
| 2018/0127006 A1 | 5/2018 | Wade | |
| 2018/0339719 A1 | 11/2018 | Loughlin | |
| 2019/0054937 A1 | 2/2019 | Graetz et al. | |
| 2019/0057548 A1 | 2/2019 | Singh et al. | |
| 2019/0156569 A1 | 5/2019 | Jung et al. | |
| 2019/0236365 A1 | 8/2019 | Speasl et al. | |
| 2020/0198675 A1 | 6/2020 | Preston et al. | |
| 2022/0009535 A1* | 1/2022 | Weiner | G06V 20/20 |
| 2022/0025826 A1 | 1/2022 | Gallagher et al. | |
| 2022/0036323 A1 | 2/2022 | Sasaki et al. | |
| 2022/0041194 A1 | 2/2022 | Lidgett et al. | |
| 2022/0044183 A1 | 2/2022 | Jordan et al. | |

OTHER PUBLICATIONS

Chen et al., Research on the Key Technologies of Big Data Based High-speed Railway Permanent Way Data Asset Collection Platform, 2020, IEEE, p. 512-516 (Year: 2020).*

Guler et al., The application of modern GIS technology in the developmentof railway asset management systems, 2005, IEEE, p. 4153-4158 (Year: 2005).*

Fernández et al., Transf-ID: Automatic ID and Data Capture for Rail Freight Asset Management, 2009, IEEE, p. 22-30 (Year: 2009).*

McMahon et al., "Approaches to Dealing With Missing Data in Railway Asset Management" IEEE, Mar. 18, 2020, retrieved on [Oct. 26, 2021].

International Search report issued in PCT/US2021/039669 dated Nov. 24, 2021.

* cited by examiner

| Rail Car | L/E | BOL# | BOL Issued | Shipped | SID# | PO# | Status |
|---|---|---|---|---|---|---|---|
| UTLX642495 | Empty | 110520200006 | 2020/11/05 9:26 | 2020/11/05 9:26 | EmptyCarMove | May52mse | HFI |

Parties to Transaction | Route & Freight Terms | Products & Hazardous | Equipment | Contacts | Customs

Equipment Detail:
Car Type: T105
Height: 181
Length: 4205
Width: 126

⚠ R3 Shell Defect
⚠ L1 Broken Outer Rim
⚠ B-End Hand Brake Wheel Bent

Maintenance Advisory
- Replace Wheelsets
- Replace Hand Brake Wheel

Equipment Detail-Weights
Loading Weight: 0
Loading Wt Qualifier: M
Tare Weight: 6800
Tare Wt Qualifier: M SCV
CAR MARK: XYZX 255292
LD LIMIT: 286,000 lbs
TARE WT: 79,000 lbs
LOCATION: IB TRACK 1
POSITION: 1
INSPECTION: PASS
GTL: NO

FIG. 11

SYSTEMS AND METHODS FOR RAILWAY ASSET MANAGEMENT

CROSS-REFERENCE TO RELATED APPLICATIONS

This application is a continuation of U.S. patent application Ser. No. 17/715,636 which was filed on Apr. 7, 2022 which is a continuation of U.S. patent application Ser. No. 17/362,174 which was filed on Jun. 29, 2021, which claims the benefit of and priority to U.S. Provisional Patent Application No. 63/048,871 which was filed on Jul. 7, 2020 and U.S. Provisional Patent Application No. 63/153,652 which was filed on Feb. 25, 2021. The contents of these applications are incorporated herein by reference in their entireties.

BACKGROUND

Statement of the Technical Field

The present document generally relates to railway asset management systems. More particularly, the present solution relates to implementing systems and methods for (i) associating a railway asset to a data collection unit and/or (ii) Augmented Reality (AR) based railyard management.

Description of the Related Art

In railcar transport systems, railcars are used to carry loose bulk commodities, liquid commodities and/or other types of goods by rail. Such goods may be loaded and unloaded at railyards. The locations of the railcars may change during different phases of a railyard management process. The phases include an inbound phase, a load/unload phase, and an outbound phase. A railyard map and scheduling system are used to coordinate movements of the railcars through the multiple tracks/paths of the railyard. The railyard map shows the locations of the railcars in the railyard, and any changes in the same as the railcars move through the railyard. The railyard map is updated manually using information obtained by individuals who are present in the railyard and who inspect the railcars. This manual process is time consuming, error prone and dangerous to personnel carrying out the various inspection processes.

Additionally, various data collection units are typically coupled to railcars. The data collection units are communicatively coupled to each other via the Internet, and therefore are collectively referred to as an Internet of Things (IoT). Companies that sell IoT based products for railcar transport systems need to associate the data collection unit(s) in the railcar transport systems with the reporting marks of the railcars to which they are coupled. These companies require their customers to manually (i) install the data collection unit(s) on the railcar, (ii) document the serial number(s) of the installed data collection unit(s), and (iii) document the reporting mark(s) on the railcar(s) on which the data collection unit(s) was(were) installed. Operations (i), (ii) and (iii) are often performed by more than one person. This is an extremely manual and error prone process that does not allow individuals to view such installation information in real-time.

SUMMARY

The present disclosure relates to implementing systems and methods for railway asset management. The methods comprise: capturing an image of the railway asset using a Mobile Communication Device (MCD); converting the image into an electronic editable image of a mark on the railway asset; wirelessly communicating the electronic editable image from the MCD to a data collection unit which is installed on the railway asset; communicating first information from the data collection unit to a remote computing device via a first network communication (the first information comprises at least the electronic editable image); comparing the first information to second information to determine whether a match exists therebetween by a given amount; and validating that the data collection unit was installed on the railway asset when a match is determined to exist between the first and second information by the given amount. The second information may be communicated from the MCD to the remote computing device with a second network communication. The second information comprises the image, pre-stored information retrieved from a datastore of a railway asset management system, and/or a datastore of another system.

The methods may also comprise: providing an electronic notification to a user of a computing device that the install was completed successfully when a match is determined to exist between the first and second information by the given amount; providing an electronic notification to a user of a computing device that the install was not completed successfully when a match is determined to not exist between the first and second information by the given amount; storing the first information in a datastore responsive to a validation that the data collection unit was installed on the railway asset; associating a unique identifier of the data collection unit with the mark in a datastore responsive to a validation that the data collection unit was installed on the railway asset; and/or discarding the first information when a determination is made that the first and second information do not match each other by the given amount.

The methods may further comprise: performing monitoring operations by the data collection unit in response to the validating to monitor at least one of an operational performance of the railway asset, a status of at least one component of the railway asset, an amount of load disposed in or on the railway asset, and a condition of an environment surrounding the railway asset; and/or analyzing information from the monitoring operations to determine whether at least one of the operational performance of the railway asset, the status of the at least one component of the railway asset, and the condition of the environment surrounding the railway asset is acceptable. The operational performance of the railway asset, the status of the at least one component of the railway asset, or the condition of the environment surrounding the railway asset may be considered acceptable when at least one of a hatch, a valve, a door, wheels, brakes, axles, a railcar connection is operating in an expected manner, an amount of load disposed in or on the railway asset is within a given range, and no leaks have been detected based on odors, scents or smells detected by a sensor of the data collection unit. One or more of the following operations may be performed when a determination is made that at least one of the operational performance of the railway asset, the status of the at least one component of the railway asset, and the condition of the environment surrounding the railway asset is unacceptable: remove the railway asset from use temporarily; order a component based on an analysis of the image; schedule maintenance for the railway asset; and adjust an amount of load in or on the railway asset. Transportation activities for the railway asset may be scheduled when a determination is made that at least one of the operational performance of the railway asset, the status of the at least one component of the railway asset, and the condition of the environment surrounding the railway asset is acceptable.

The present document also concerns methods for AR based railyard management. The methods comprise: using a virtual reality device to recognize and collect real world information about railway assets located in a railyard; and using the real world information to provide an individual with an augmented reality experience associated with the railyard and facilitate automated railyard management tasks. The automated railyard management tasks can include, but are not limited to, validating a train consist, validating information disposed on the railway assets, detecting locations of the railway assets in the railyard, updating a map of the railyard, monitoring states of the railway assets while in the railyards, detecting damage to the railway assets in the railyards, detecting hazards of the railway assets, predicting future issues with the railway assets based on machine learned information, performing maintenance checks for components of the railway assets, scheduling maintenance for the railway assets, facilitating maintenance of railway assets using a robotic manipulator which is remotely controlled via a virtual reality environment, performing security checks for the railyard, performing security checks for the railway assets, performing compliance checks for the railway assets, and/or providing notifications to individuals.

The augmented reality experience is provided to the individual by: allowing a real world environment of the railyard to be visible to an individual who is wearing the virtual reality device; generating holographic image data using the real world information; and overlaying the holographic image data on the visible real world environment. The real world information can include, but is not limited to, locations of the railway assets, information disposed on the railway assets (e.g., railcar marks), physical conditions of the railway assets (e.g., having or absent of dents, cracks, wear, etc. and/or having operative or defective brakes, hatches, discharge gates, ports, etc.), operating states of components of the railway assets (e.g., open, closed, sealed, latched, unlatched, etc.), and/or physical conditions of the components of the railway assets (e.g., having or absent of dents, cracks, wear, tears, etc. and/or having worn brakes, etc.).

The methods may also comprise: performing a machine learning algorithm using the real world information to predict a future event or condition relating to at least one railway asset of the railway assets (e.g., predicted mechanical fault and/or derailment); causing an action (e.g., schedule maintenance, order part, temporarily remove from use, etc.) to be taken in relation to the railway asset based on the predicted future event or condition; using the real world information to facilitate an inspection of the railway assets by an individual remote from the railyard; and/or using real world information to facilitate a remote control of a robotic manipulator located in the railyard.

The implementing systems can comprise: a processor; and a non-transitory computer-readable storage medium comprising programming instructions that are configured to cause the processor to implement a method for railway asset management.

BRIEF DESCRIPTION OF THE DRAWINGS

The present solution will be described with reference to the following drawing figures, in which like numerals represent like items throughout the figures.

FIGS. 10-12 each provides an illustration of an illustrative Graphical User Interface (GUI).

DETAILED DESCRIPTION

Figure 1:
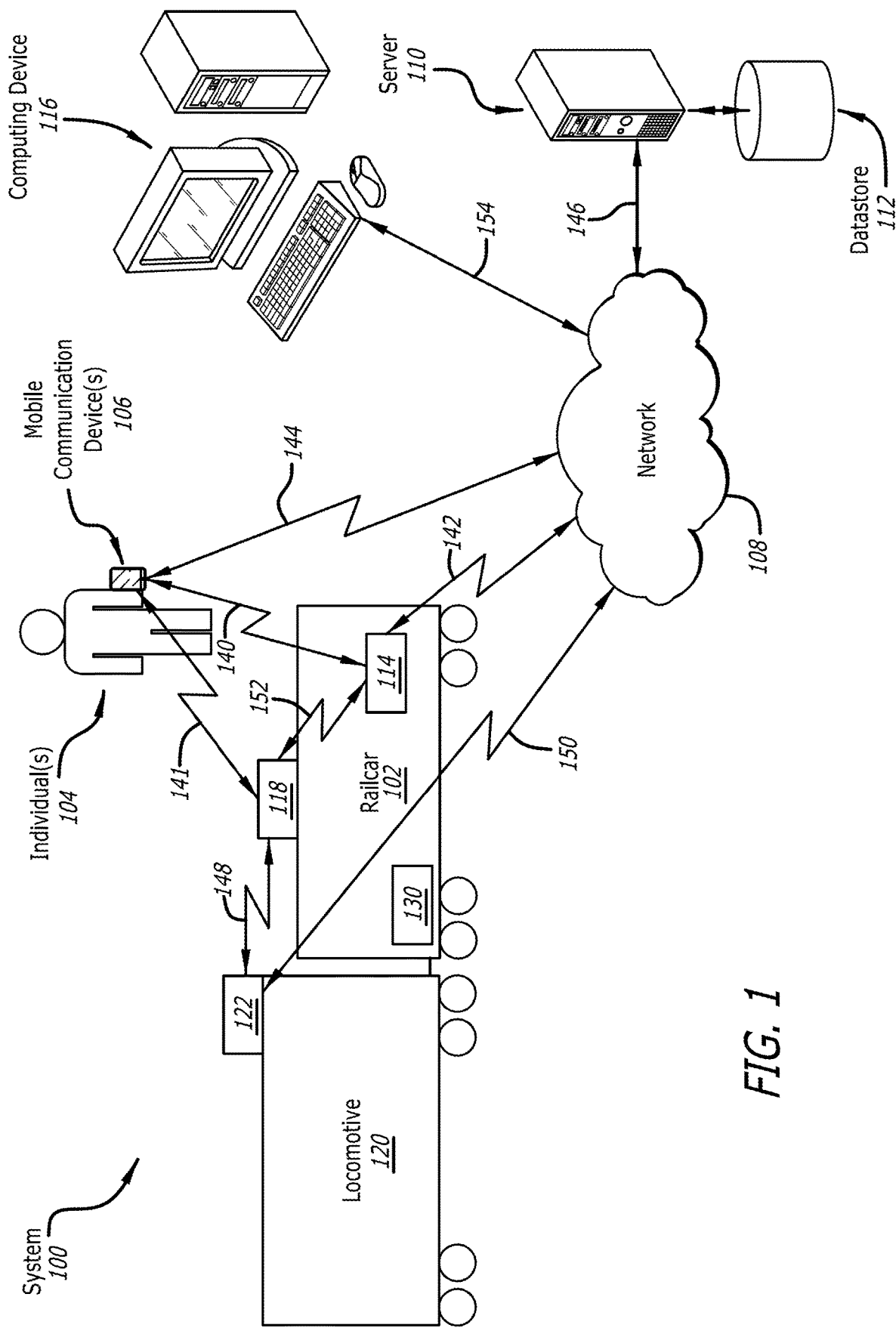
FIG. 1 provides an illustration of an illustrative system.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As noted above, companies that sell IoT based products for railcar transport systems need to associate the data collection unit(s) in the railcar transport systems with the reporting marks of the railcars to which they are coupled. These companies require their customers to manually (i) install the data collection unit(s) on the railcar, (ii) document the serial number(s) of the installed data collection unit(s), and (iii) document the reporting mark(s) on the railcar(s) on which the data collection unit(s) was(were) installed. This is an extremely manual and error prone process that does not allow individuals to view such installation information in real-time.

The present solution solves these drawbacks of the conventional solutions. The present solution generally provides implementing systems and methods for automatically associating a reporting mark of a railcar to data collection unit(s) in the field as an individual is installing the data collection unit(s) on the railcar. This automatic association process is achieved using an MCD in the possession of the individual. The MCD can include, but is not limited to, a smart phone, a Personal Digital Assistant (PDA), a personal computer, a laptop, a tablet, smart glasses, a virtual reality device, and/or a data collection unit. The manner in which the MCD facilitates the automatic association process will become evident as the discussion progresses. This association between railcar reporting marks and data collection units allows end users to easily and quickly access field data associated with the same. This field data can include, but is not limited to, tare weight(s), maximum weight(s), certification data (e.g., certification reference number(s) and/or certification date(s)), data collected from sensors (e.g., a wired sensor or WSN) installed on the railcar (e.g., commodity temperature sensor data, hatch status data, bearing temperature data, and/or load status data), and/or railcar/locomotive component data (e.g., make, model, serial number, wheel size, etc.).

The present solution also provides an AR based solution to automate railyard management tasks. The automated railyard management tasks include, but are not limited to, validating train consists, validating information and/or markings on railway assets, detecting/tracking locations of railway assets in railyards, updating railyard maps, monitoring states of the railway assets while in the railyards (e.g., inbound state, loading state, unloading state, maintenance state, fueling state, cleaning state, and/or outbound state), detecting damage to railway assets in the railyards, detecting hazards to railway assets, hazards on railway assets (e.g., a tripping or fall hazard caused by a broken or missing rung on a ladder), predicting future issues with railway assets based on machine learned information (e.g., a predicted derailment of a railcar based on detected state(s) of components thereof (e.g., a detected crack or other mechanical fault in a wheel, axle, bearing, etc.), or predicted component failure (e.g., based on life expectancy thereof, component type, duration of use, and/or amount of wear/tear from use), performing maintenance checks for various components of the railway assets (e.g., wheels, appliances, ladders, etc.), scheduling maintenance for the railway assets, facilitating maintenance of railway assets using robotic manipulator(s) (e.g., articulating arms) which are remotely controlled via a Virtual Reality (VR) environment, performing security checks, performing compliance checks (e.g., regulatory, shipping, customer, etc.), and providing alerts/notifications to relevant parties/individuals.

Accordingly, the methods of the present solution generally involve: using an AR device to recognize and collect information about the locations and states of railway assets in a railyard; and using the collected information to facilitate automated railyard management tasks (e.g., such as those listed above). Railway assets may include, but are not limited to, railcars, locomotives, rail maintenance equipment, containers, and International Standards Organization (ISO) tanks. In this document, a railcar will be used for illustrative purposes. A railcar can include, but is not limited to, a hopper car or tank car.

The present solution can be used in various applications. Such applications include, but are not limited to, installation training applications, installer applications, railcar management applications, railcar maintenance applications, railcar certification applications, railcar transport applications, and/or any other application in which locations and/or operational states of assets need to be monitored and/or tracked. For example, the present solution can be employed in the systems described in, for example, U.S. Pat. No. 10,850,755 to Lefebvre et al. ("the '755 patent") which issued on Dec. 1, 2020, U.S. Pat. No. 10,710,619 which issued on Jul. 14, 2020, U.S. Pat. No. 9,663,092 which issued on May 30, 2017, U.S. Pat. No. 10,137,915 which issued on Nov. 27, 2018, and U.S. Pat. No. 9,981,673 which issued May 29, 2018. The content of the listed patents are incorporated herein in their entirety.

Illustrative Systems for Associating a Railcar to a Data Collection Unit

Referring now to FIG. 1, there is provided an illustration of an illustrative system 100 implementing the present solution. System 100 comprises a railcar 102 coupled to a locomotive 120. An individual 104 is provided to install at least one data collection unit 118 on the railcar 102. The data collection unit 118 can include, but is not limited to, a gateway, a sensor (e.g., wired sensor or a wireless sensor), and/or a Communication Management Unit (CMU). The sensor can include, but is not limited to, a temperature sensor (e.g., ambient and/or wheel bearing), a weight sensor (e.g., for measuring a weight of commodities loaded on the railcar), a force sensor (e.g., for measuring forces experienced by the railcar during coupling), a location sensor (e.g., for specifying a location of the railcar in a rail yard and/or on a train track), a humidity sensor, an odor/scent/smell sensor (e.g., for detecting leaks or spills of hazardous chemicals), a light sensor, an air pressure sensor, a vibration sensor, an accelerometer, a traveling speed sensor, a traveling direction sensor, a hatch position sensor, a brake pressure sensor, a hand brake on/off sensor, a railcar load sensor (e.g., to indicate whether the railcar is full or empty), a commodity sensor (e.g., to indicate a presence, state and/or type of commodities loaded on the railcar), a bearing fault sensor, a piezo-electric sensor, an acoustic sensor, and/or a track damage detection sensor. The coupling can be achieved via a weld, a mechanical coupler (e.g., a screw, a bolt, a nut, a clamp, a latch, bracket, etc.), and/or an adhesive.

The individual 104 may have an MCD 106 in his(her) possession. The MCD 106 can include, but is not limited to, a mobile phone, a smart phone, a personal computer, a laptop, a tablet, a PDA, a smart watch, smart glasses, a smart helmet, and/or a smart visor (e.g., coupled to a hat and/or a vehicle such as a personal transporter). During installation of the data collection unit 118, the individual 104 uses the MCD 106 to manually input a mark disposed on the railcar 102 and/or capture an image of the mark 130 disposed on the railcar 102. The mark 130 can include one or more letters, numbers and/or symbols.

In some scenarios, the captured image is processed by the MCD 106 to at least (i) detect the mark within the captured image and (ii) generate an electronic and editable image of a mark (e.g., a railcar mark) on a railway asset (e.g., a railcar) based on the detected mark (e.g., a string of letters, numbers and/or symbols) within the captured image. Operation (i) can be achieved using any known or to be known Optical Character Recognition (OCR) algorithm. The OCR algorithm may also be used to obtain other railcar information about the railcar 102 from the captured image. This other railcar information can include, but is not limited to, tare weight(s), maximum weight(s), certification reference number(s), certification date(s), data collected from sensors installed on the railcar (e.g., commodity temperature sensor data, hatch status data, bearing temperature data, and/or load status data), railcar/locomotive component data (e.g., make, model, serial number, wheel size, etc.), and/or maintenance information (e.g., date/time of last maintenance and/or type of maintenance performed).

The individual 104 compares the electronic editable mark to the mark 130 disposed on the railcar 102. If a match does not exit, then the individual 104 modifies the electronic editable version of the mark so that the same accurately and/or completely represents the actual mark 130. Techniques for modifying/editing images and/or strings of letters/numbers/symbols are well known in the art. Any known or to be known technique for modifying/editing images and/or strings of letters/numbers/symbols can be used herein without limitation. For example, the user can perform user-software interactions via a touch screen, a keypad and/or other input means for modifying content presented in a display. Railcar mark information specifying the mark is then sent from the MCD 106 to the data collection unit 118 and/or wireless sensor node(s) 114 via a Near Field Communication (NFC) and/or a Short Range Communication (SRC) 140, 141. The other railcar information may also be sent along with the railcar mark information.

The data collection unit 118 then sends the railcar mark information, the other railcar information and/or metadata to a remote server 110 via a network 108 (e.g., the Internet, a cellular network, a radio network, a satellite based network) (as shown by communication links 152, 142 and 146), a wireless sensor node 114 of railcar 102 and/or a gateway 122 of the locomotive 120 (as shown by communication links 142, 148, 150, 152). The metadata can include, but is not limited to, a unique identifier of the data collection unit 118, a unique identifier of the individual 104 and/or MCD 106, time information indicating when the data collection unit 118 was installed on the railcar 102, time information indicating a time when the railcar mark information was received at and/or transmitted from the data collection unit 118, and/or location information indicating a location of the data collection unit 118 at the time of receipt and/or transmission of the railcar mark information.

At the remote server 110, the railcar mark information and/or metadata are stored in a datastore 112 and/or presented to a user thereof. In the datastore 112, the unique identifier of the data collection unit 118 is associated with the mark 130 of the railcar 102 and/or other information associated with the railcar 102 (e.g., sensor data, weight(s), certification information and/or maintenance information).

Additionally or alternatively, an electronic message is sent to one or more computing devices 116 located at a site at which the railcar 102 resides and/or at a site that is remote from the site at which the railcar 102 resides. The electronic message can include, but is not limited to, an email message, a website alert, an Internet instant message, and/or a text message from the server 110. The electronic message provides a notification that the data collection unit 118 has been properly installed on the railcar 102 by the individual 104. The electronic message can be sent from the server 110 and/or MCD 106 to the computing device 116 as shown by communication links 146, 154 and/or 144, 154.

The MCD 106 may additionally or alternatively send the captured image of the railcar 102, the railcar mark information, the other railcar information and/or metadata to the remote server 110 via the network 108, as shown by communication links 144 and 146. The metadata can include, but is not limited to, a unique identifier of the MCD 106, a unique identifier of the individual 104, a unique identifier of the data collection unit 118, time information specifying a time at which the data collection unit 118 was installed, time information specifying a time at which the captured image was transmitted from the MCD 106 to data collection unit 118 and/or server 110, and/or location information specifying a location of the MCD 106 at the time of installation of the data collection unit 118.

At the server 110, the information received from the MCD 106 may be compared to the information received from the data collection unit 118. If the information received from the MCD 106 matches the information received from the data collection unit 118 by a certain amount (e.g., 50-100%), then the server validates that the data collection unit 118 was installed on the railcar 102. When this validation is made, the railcar mark information and/or metadata (from the data collection unit 118 and/or MCD 106) are stored in a datastore 112 and/or presented to a user of the computing device(s) 110, 116. In the datastore 112, the unique identifier of the data collection unit 118 is associated with the mark 130 of the railcar 102 and/or other information associated with the railcar 102 (e.g., sensor data, weight(s), certification information and/or maintenance information). Additionally or alternatively, the electronic message is sent to the computing device(s) 116 from the server 110 and/or the MCD 106.

The above described operations of system 100 help to automate the process of associating the railcar 102 and a data collection unit 118 in the field (for example, a railyard), and minimizes typographical errors made by individuals manually entering the complete railcar mark into the system. Additionally, the individual 104 is able to relatively quickly retrieve railcar data (e.g., tare weights, maximum weight, certification data and/or data collected by sensor(s)) and to correlate the same with other data (e.g., installation data). The present solution also solves the issue of associating the railcar 102 and data collection unit 114 when a network 108 is not available. The manner in which this issue is addressed will become evident as the discussion progresses.

Figure 2:
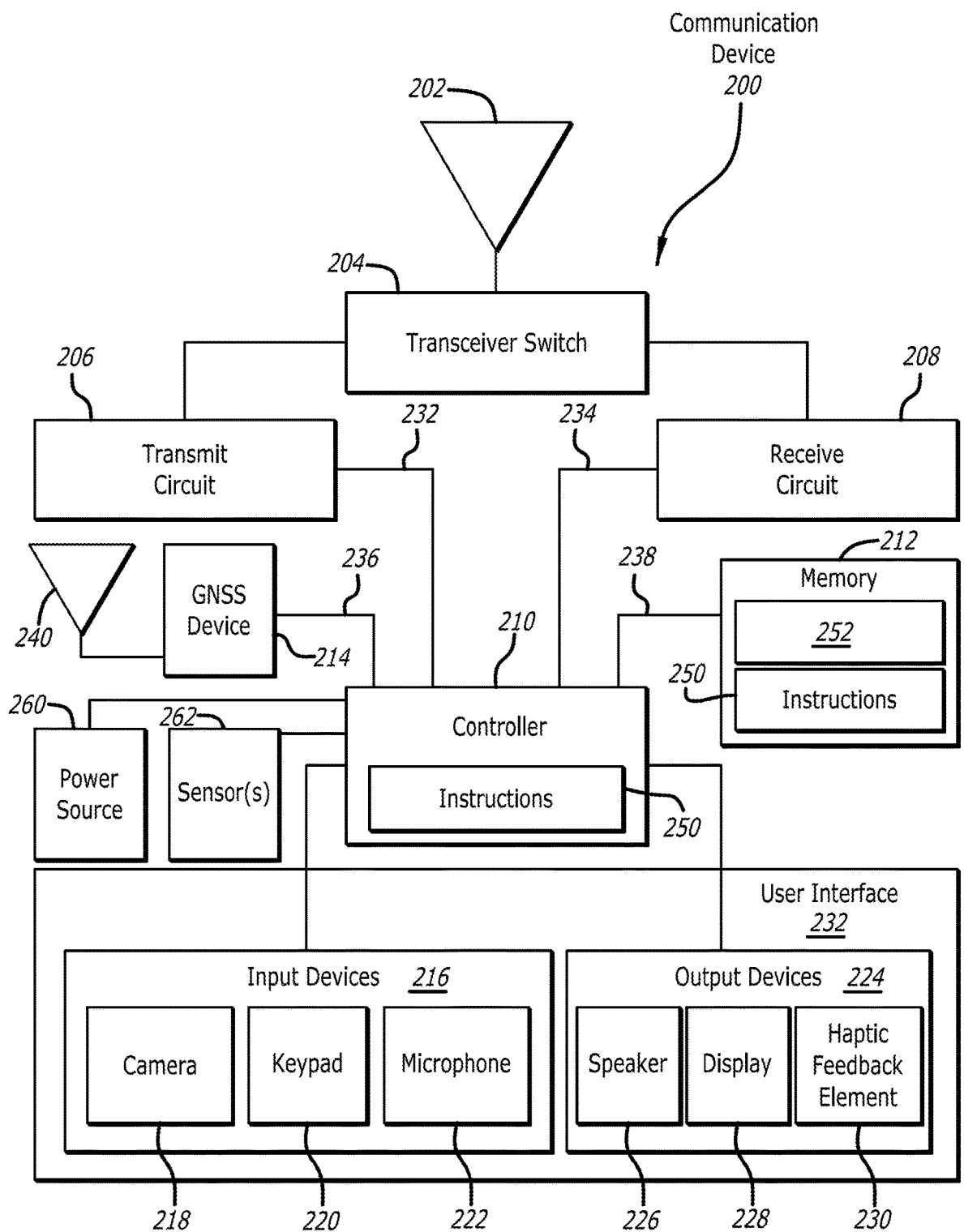
FIG. 2 provides an illustration of an illustrative MCD.

Referring now to FIG. 2, there is provided an illustration of an illustrative architecture for a communication device 200. The MCD 106, wireless sensor node 114, data collection unit 118, and/or gateway 122 of FIG. 1 is/are the same as or similar to the communication device 200 of FIG. 2. As such, the discussion of communication device 200 is sufficient for understanding devices 106, 114, 118, 122 of FIG. 1.

Communication device 200 may include more or less components than those shown in FIG. 2. However, the components shown are sufficient to disclose an illustrative hardware architecture implementing the present solution. The hardware architecture of FIG. 2 represents one embodiment of a representative communication device configured to facilitate an association of a railcar to a data collection unit. The operations and functions can include, but are not limited to, communicating information to/from external devices, perform OCR based processes to detect objects in captured images, process information extracted from images, and output information to a user of the communication device 200.

As shown in FIG. 2, the communication device 200 comprises an antenna 202 for receiving and transmitting wireless signals (e.g., RF signals, cellular signals, and/or satellite signals). A transceiver switch 204 selectively couples the antenna 202 to a transmit circuit 206 and a receive circuit 208 in a manner familiar to those skilled in the art. The present solution is not limited in this regard. The communication device 200 can alternatively comprise one or more antennas for each transceiver circuit 206 and 208, and therefore may be absent of the transceiver switch 204 for selectively connecting the transmit circuit and receive circuit to a common antenna.

Transmit and receive circuits are well known in the art, and therefore will not be described in detail herein. Still, it should be understood that the transmit circuit 206 is configured to (i) cause information to be transmitted to an external device (e.g., server 110 of FIG. 1) via wireless signals and (ii) process wireless signals received from the external device to extract information therefrom. The transmit and receive circuits 206, 208 are coupled to a controller 210 via respective electrical connections 232, 234. In a transmit mode, the controller 210 also provides information to the transmit circuit 206 for encoding and modulating information into wireless signals. The transmit circuit 206 communicates the wireless signals to the antenna 202 for transmission to an external device (e.g., server 110 of FIG. 1). In a receive mode, the receive circuit 208 provides decoded wireless signal information to the controller 210. The controller 210 uses the decoded wireless signal information in accordance with the function(s) of the communication device 200.

An antenna 240 is coupled to Global Navigation Satellite System (GNSS) device 214. The GNSS device 214 can include, but is not limited to, a Global Positioning System (GPS) receiver circuit for receiving GPS signals. Those skilled in the art will appreciate that GPS is just one form of a GNSS. Other types of GNSSs include GLONASS, Galileo, and/or BeiDou. The GNSS device 214 demodulates and decodes the signals to extract location information therefrom. The location information indicates the location of the communication device 200. The GNSS device 214 provides the decoded location information to the controller 210. As such, the GNSS device 214 is coupled to the controller 210 via an electrical connection 236. The controller 210 uses the decoded location information in accordance with the function(s) of the communication device 200.

The controller 210 stores the decoded wireless signal information and the decoded location information in a memory 212 of the communication device 200. Accordingly, the memory 212 is connected to and accessible by the controller 210 through an electrical connection 232. The memory 212 may be a volatile memory and/or a non-volatile memory. For example, the memory 212 can include, but is not limited to, a Random Access Memory (RAM), a Dynamic Random Access Memory (DRAM), a Static Random Access Memory (SRAM), a Read-Only Memory (ROM), and/or a flash memory.

As shown in FIG. 2, one or more sets of instructions 250 are stored in the memory 212. The instructions 250 can also reside, completely or at least partially, within the controller 210 during execution thereof by the communication device 200. In this regard, the memory 212 and the controller 210 can constitute machine-readable media. The term "machine-readable media", as used here, refers to a single medium or multiple media that store the one or more sets of instructions 250. The term "machine-readable media", as used here, also refers to any medium that is capable of storing, encoding or carrying the set of instructions 250 for execution by the communication device 200 and that cause the communication device 200 to perform one or more of the methodologies of the present disclosure.

The controller 210 is also connected to a user interface 232. The user interface 232 comprises input devices 216, output devices 224, and software routines (not shown in FIG. 2) configured to allow a user to interact with and control software applications 252 installed on the communication device 200. Such input and output devices respectively include, but are not limited to, a display 228, a speaker 226, a keypad 220, a directional pad (not shown in FIG. 2), a directional knob (not shown in FIG. 2), a camera 218 and a microphone 222. The display 228 may be designed to accept touch screen inputs.

The communication device 200 may further comprise a haptic feedback element 230, and/or a power source 260. The haptic feedback element 230 can include, but is not limited to, a sound generator (e.g., a speaker), a visual alert generator (e.g., a light emitting diode(s)), a vibration generator, and/or a haptic motor. All of the listed devices are well known in the art, and therefore will not be described here. The haptic feedback element 230 is configured to provide users with auditory, visual and/or tactile notifications of what operations and/or functions have been selected, and/or a status of certain operations and/or functions.

The power source 260 can include, but is not limited to, a battery, an internal power generator, external power source, and/or an energy harvesting circuit. The energy harvesting circuit is generally configured to harvest energy from a surrounding environment that can be used to power the electronic components of the communication device 200. The harvested energy can include, but is not limited to, light, RF energy, vibration and/or heat.

Sensors 262 may also be provided with the communication device 200. The sensors 262 can include, but are not limited to, cameras, accelerometers, vibration sensors, orientation sensors, temperature sensors, humidity sensors, and/or odor/sent/smell sensors.

Figure 3:
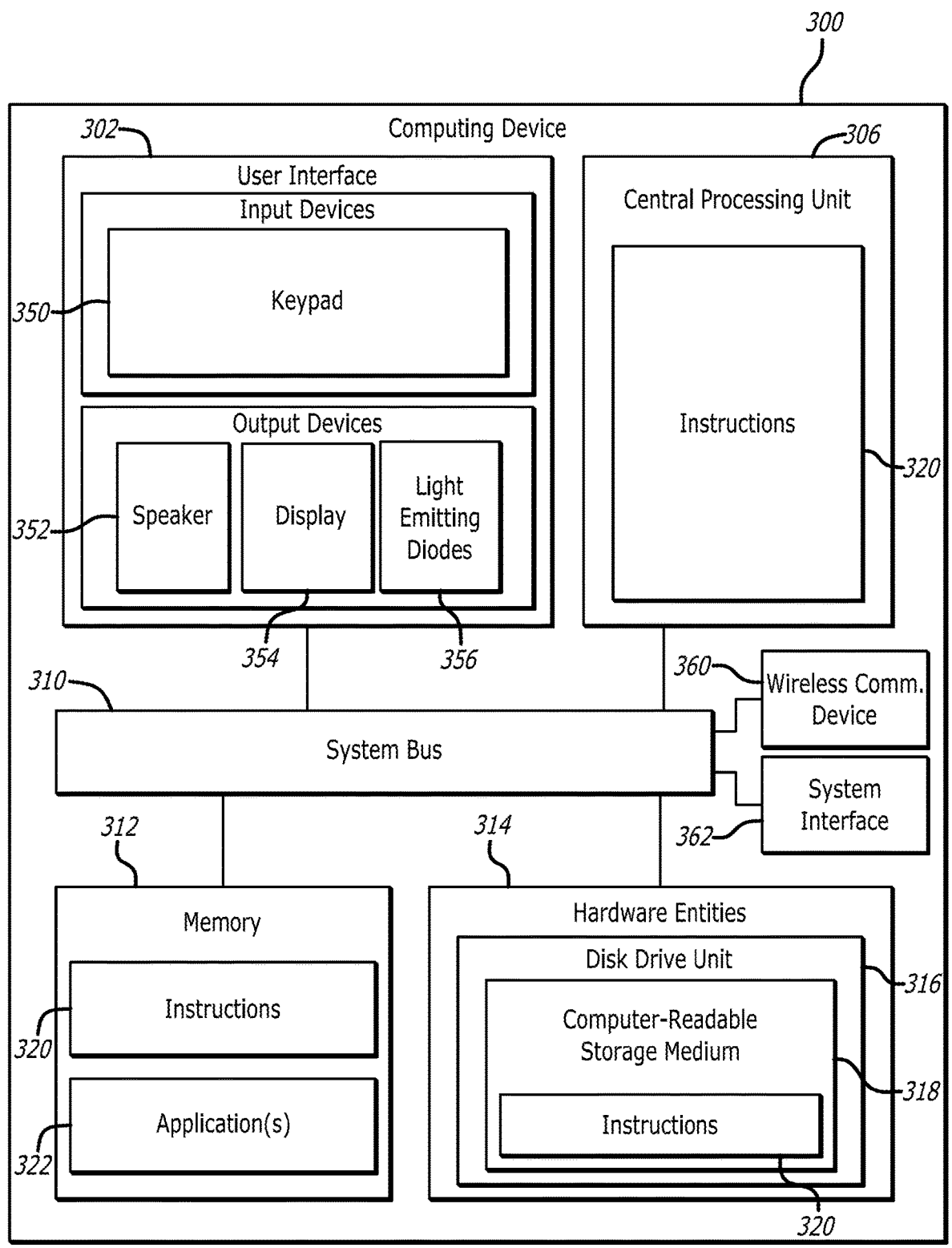
FIG. 3 provides an illustration of an illustrative computing device.

Referring now to FIG. 3, there is provided a detailed block diagram of an illustrative architecture for the computing device 300. The MCD 106, server 110, wireless sensor node 114, data collection unit 118, computing device 116 and/or gateway 122 of FIG. 1 is/are the same as or similar to computing device 300. As such, the discussion of computing device 300 is sufficient for understanding devices 106, 110, 114, 116, 118, 122 of FIG. 1.

Computing device 300 may include more or less components than those shown in FIG. 3. However, the components shown are sufficient to disclose an illustrative embodiment implementing the present solution. The hardware architecture of FIG. 3 represents one embodiment of a representative computing device configured to facilitate system management of railcar(s) and data collection unit(s). As such, the computing device 300 of FIG. 3 implements at least a portion of the methods described herein for associating a railcar to a data collection unit.

Some or all the components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a CPU 306, a system bus 310, a memory 312 connected to and accessible by other portions of computing device 300 through system bus 310, and hardware entities 314 connected to system bus 310. The user interface can include input devices (e.g., a keypad 350) and output devices (e.g., speaker 352, a display 354, and/or light emitting diodes 356), which facilitate user-software interactions for controlling operations of the computing device 300.

At least some of the hardware entities 314 perform actions involving access to and use of memory 312, which can be a RAM. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 204 and that cause the computing device 300 to perform any one or more of the methodologies of the present disclosure.

In some scenarios, the hardware entities 314 include an electronic circuit (e.g., a processor) programmed for facilitating the association of a railcar to a data collection unit. In this regard, it should be understood that the electronic circuit can access and run a software application 322 installed on the computing device 300.

A wireless communication device 360 and/or a system interface 362 may also be provided with the computing device 300. The wireless communication device 360 is configured to facilitate wireless communications between the computing device 300 and external devices (e.g., remote server 110, MCD(s) 106, data collection unit 118, and/or gateway 122 of FIG. 1). The wireless communications can include, but are not limited to, NFCs, SRCs (e.g., WiFi Bluetooth, and/or LoRA), satellite communications, and/or cellular communications. The system interface 362 is configured to facilitate wired and/or wireless communications between the computing device 300 and external devices (e.g., remote server 110, MCD(s) 106, data collection unit 118, and/or gateway 122 of FIG. 1). In this regard, the system interface 362 can include, but is not limited to, an Ethernet interface, an RS232 interface, an RS422 interface, and/or a USB interface.

Methods for Associating a Railway Asset to a Data Collection Unit

Figure 4A:
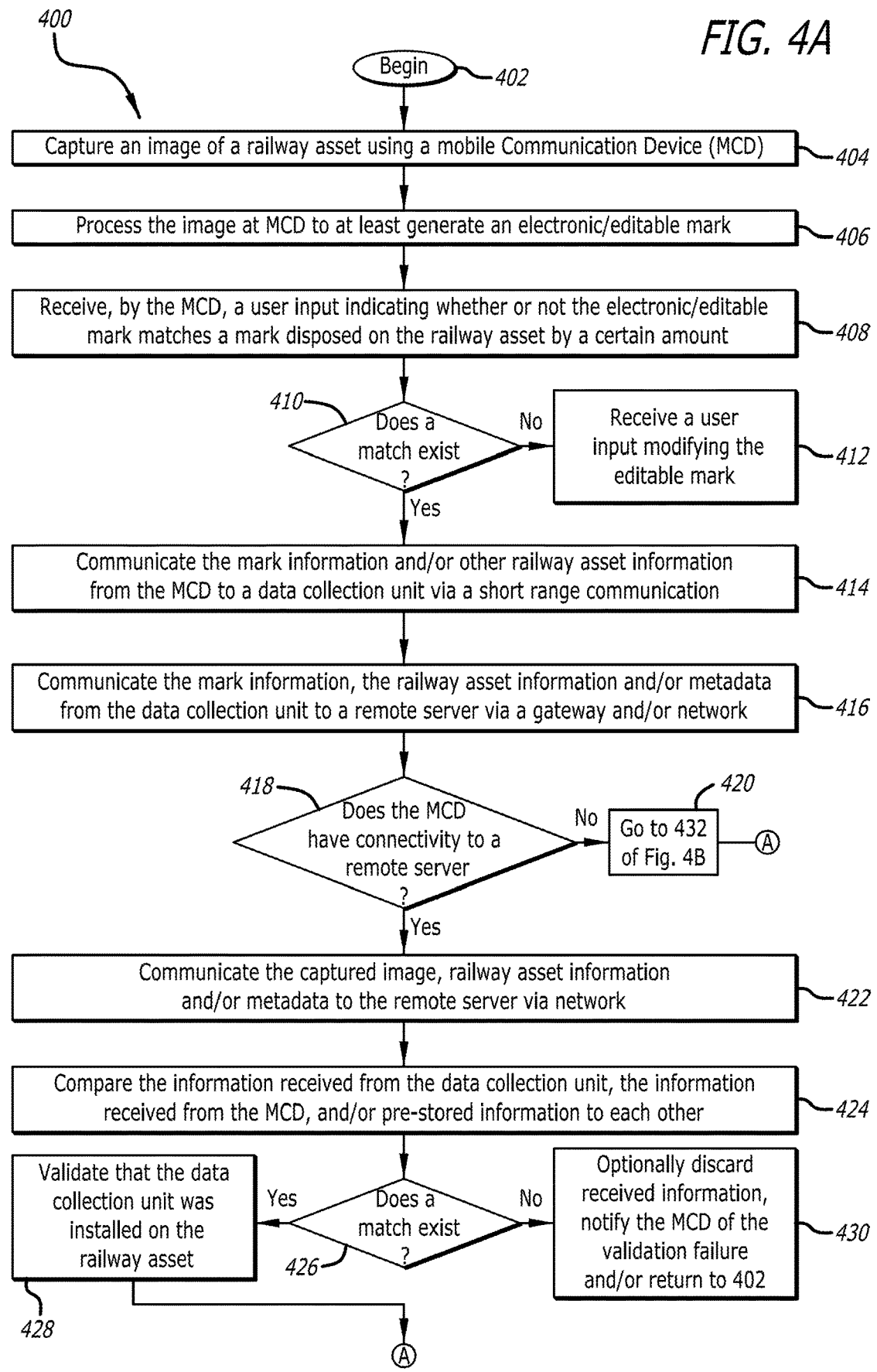
FIGS. 4A-4B (collectively referred to herein as "FIG. 4") provide a flow diagram of an illustrative method for associating a railcar to a data collection unit.

Referring now to FIG. 4A, there is provided a flow diagram of a method 400 for associating a railway asset (e.g., a railcar) to a data collection unit. Method 400 begins with 402 and continues with 404 where an image is captured of a railway asset (e.g., railcar 102 of FIG. 1) using an MCD (e.g., MCD 106 of FIG. 1). The captured image is then processed in 406 by the MCD to at least generate an image of a mark (e.g., a railcar mark) on a railway asset in an electronic editable form. The electronic editable mark can include one or more letters, number, graphics and/or symbols. The electronic editable mark can be edited and/or modified by a user of the MCD. In 408, the MCD receives a user input indicating whether or not the electronic editable mark matches a mark (e.g., mark 130 of FIG. 1) disposed on the railway asset by a certain amount (e.g., >75%). If the user input indicates that the electronic editable mark does match the mark disposed on the railway asset by the certain amount [410: NO], then method 400 continues with 412 where the MCD receives a user input for modifying the electronic editable mark. Otherwise [410: YES], method 400 continues with 414.

In 414, various information is sent from the MCD to a data collection unit (e.g., data collection unit 118 of FIG. 1) via SRC(s) (e.g., an RFID communication and/or a Bluetooth communication). The present solution is not limited in this regard. Long Range Communications (LRCs) can be used in 414 as an alternative to or in addition to SRC(s). This information includes, but is not limited to, the mark information and/or other railway asset information. This information may also be sent to a data collection unit via a gateway and/or sensor. In 416, the mark information, the railway asset information and/or metadata is sent from the data collection unit to a remote sever (e.g., remote sever 110 of FIG. 1) via a device (e.g., gateway and/or CMU 122) and/or a network (e.g., network 108 of FIG. 1).

Next in 418, a determination is made as to whether the MCD has connectivity to the remote server. If not [418: NO], method 400 continues to 432 of FIG. 4B, as shown by 420. The operations of 432 will be discussed below.

If so [418: YES], then 422 is performed where the captured image, railway asset information and/or metadata are communicated to the remote server via the network. At the remote server, comparison operations may be performed in 424 to compare the information received from the data collection unit, the information received from the MCD, and/or pre-stored information to each other. The pre-stored information can include information stored in a datastore (e.g., datastore 112 of FIG. 1) accessible to the remote server and/or a datastore that is hosted by a third party. In some scenarios, these operations can be at least partially performed by the data collection unit.

If the comparison results indicate that a match does not exist between compared information [426: NO], method 400 continues with 430 where the received information is optionally discarded, the MCD is notified of a validation failure, and/or the process returns to 402. The notification may provide a means to cause the MCD to prompt the individual (e.g., individual 104 of FIG. 1) to move the MCD in a position such that the railway asset is in its camera's Field of View (FOV), detect when the camera is in position, capture another image of the railway asset, generate another electronic editable mark for the railway asset, receive a user input regarding the accuracy and/or completeness of the electronic editable mark, and/or communicate the electronic editable mark to the remote server (directly or indirectly).

In contrast, if the comparison results indicate that a match does exist between compared information [426: YES], 428 is performed where a validation is made that the data collection unit was installed on the railway asset. Thereafter, method 400 continues with 432 of FIG. 4B.

Figure 4B:
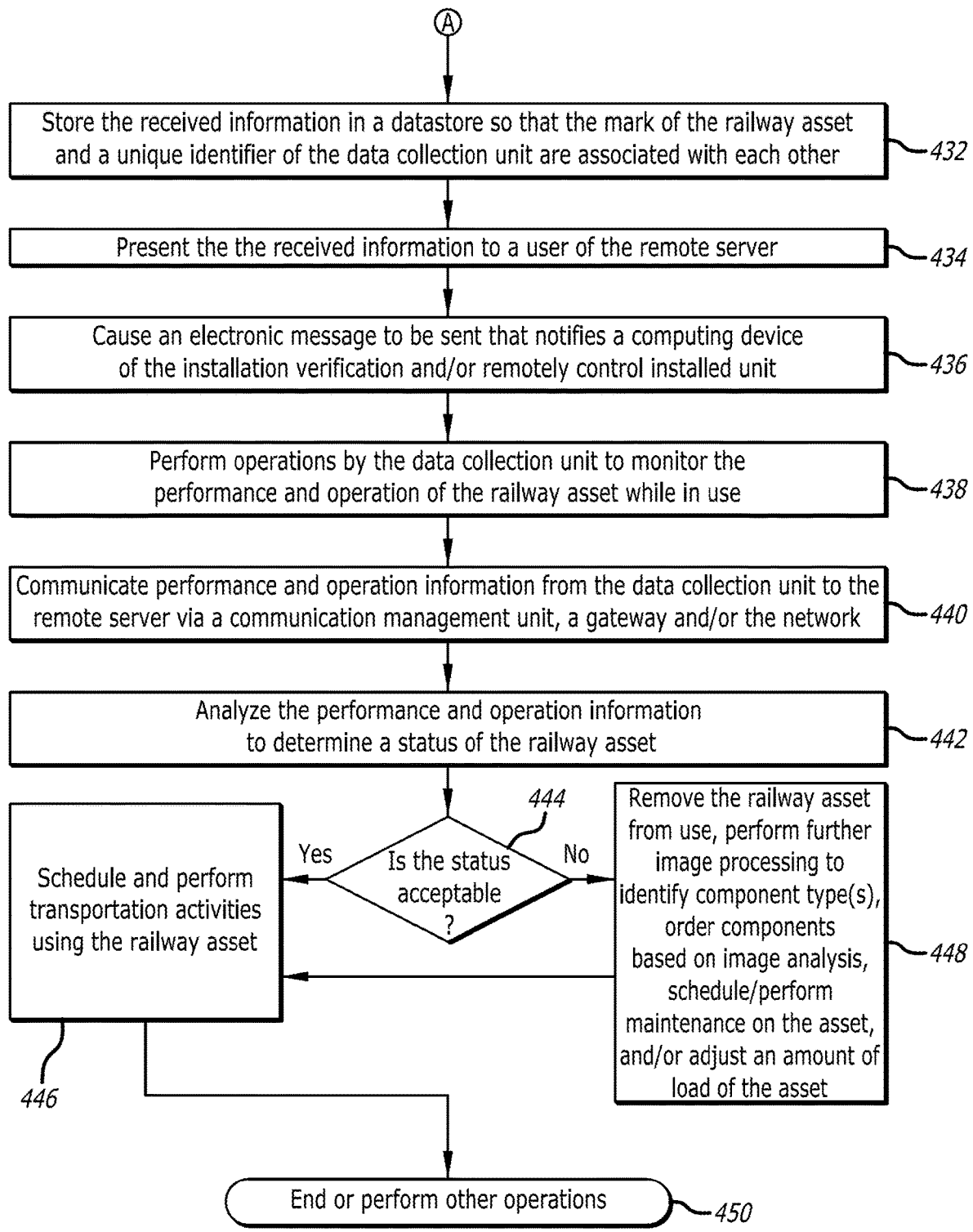

As shown in FIG. 4B, 432 involves storing the received information from the MCD in a datastore so that the mark of the railway asset and a unique identifier of the data collection unit are associated with each other. Notably, in the scenarios where the MCD does not have connectivity to a network, the information is stored on the MCD until connectivity is restored, or until the data collection unit receives the data and sends the same to the server. The received information may also be presented to a user of a computing device (e.g., sever 110 of FIG. 1 and/or computing device 116 of FIG. 1), as shown by 434.

An electronic message may also be sent in 436 that notifies a computing device (e.g., computing device 116 of FIG. 1) of the installation verification. In response to the electronic message, the computing device may establish a communication session with the installed data collection unit (e.g., data collection unit 118 of FIG. 1), remotely cause the data collection unit to perform a systems test and/or calibration process, receive data resulting from performance of the systems test and/or calibration process, identify or otherwise detect any system or operational faults/errors/issues based on the data received from the data collection unit, issue any alerts/notifications to the individual (e.g., individual 104 of FIG. 1) regarding the operational faults/errors/issues so that any remedial measures can be taken to address the system faults/errors/issues (e.g., re-initialize software, upgrade software, replace a part, or replace the entire data collection unit).

Subsequently in 438, the data collection unit performs operations to, but not limited to, (i) monitor the performance and operation of the railway asset (e.g., a railcar), (ii) monitor statuses of components (e.g., hatches, valves, etc.) of the railway asset, (iii) monitor an amount of load disposed in/on the railway asset, and/or (iv) monitor conditions of an environment surrounding the railway asset. Such operations may be performed by the data collection unit in response to a command received from the MCD, individual in possession of the MCD, and/or a remote device (e.g., computing device 116 of FIG. 1). Information is communicated in 440 from the data collection unit to the remote sever via a wireless sensor node (e.g., wireless sensor node 114 of FIG. 1), a gateway (e.g., gateway 122 of FIG. 1) and/or a network (e.g., network 108 of FIG. 1). The information is analyzed in 442 to determine a status of the railway asset, a status of at least one component of the railway asset, and/or conditions of the environment surrounding the railway asset (e.g., temperature, humidity, amount of light, presence of smoke, presence of fumes of given types, etc.).

If the status(es)/conditions is(are) acceptable [444: YES], then 446 is performed where transportation activities for the railway asset are scheduled. For example, the status(es)/condition(s) is(are) considered acceptable when all hatches/valves/doors are able to be opened/closed/locked/unlocked, the wheels/brakes/axles/railcar connector (e.g., a coupler) is(are) operating as expected, an amount of load disposed in the railway asset is within a given range, and/or the load is being fully retained inside the railway asset (e.g., no leaks are detected based on odors/scents/smells detected by an odor/scent/smell sensor).

In contrast, if the status(es)/condition(s) is(are) not acceptable [444: NO], then 448 is performed where the railway asset is removed from use temporarily, further image processing is performed to identify component type(s) and/or component serial number(s), component(s) is(are) ordered based on the image processing, maintenance for the railway asset is scheduled and/or performed, and/or an amount of load of the railway asset is adjusted. Upon completing 444, 446 and/or 450 may be performed. In 450, method 400 ends or other operations are performed (e.g., return to 402 of FIG. 4A).

The above described systems 100 and methods 400 can be implemented in AR based railyard management systems and/or other AR based systems. One such AR based railyard management systems is discussed below in which the present solution can be implemented.

Systems for AR Based Railyard Management

Figure 5:
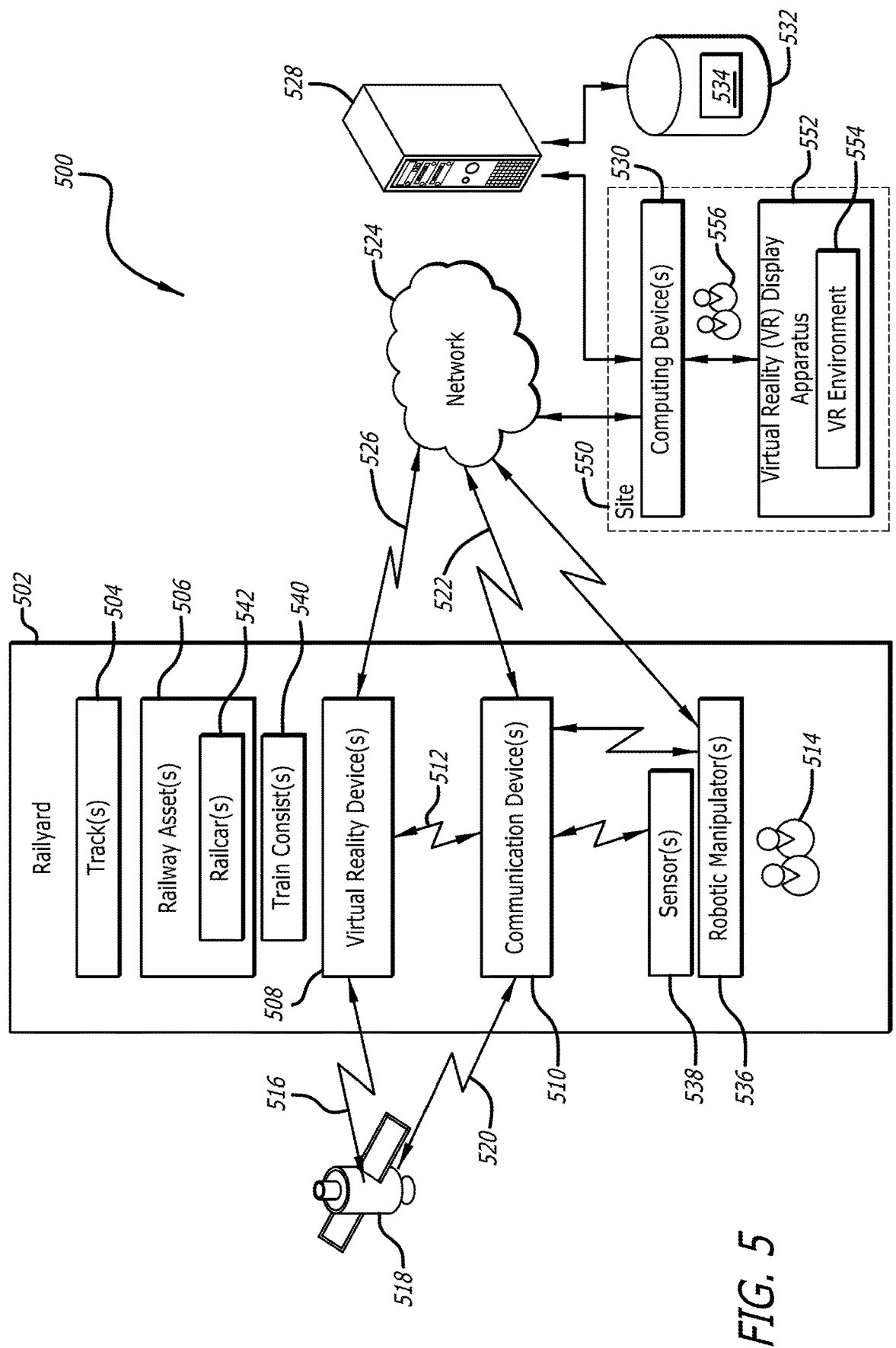
FIG. 5 provides an illustration of an illustrative system implementing the present solution.

Referring now to FIG. 5, there is provided an illustration of another system 500. System 500 can include some or all of the components of system 100 of FIG. 1. The relationship between systems 100 and 500 will become evident as the discussion progresses.

As shown in FIG. 5, system 500 comprises a railyard 502 with one or more tracks 504. Railway asset(s) 506 may reside on track(s) 504. An illustration is provided in FIG. 6 that shows a set of tracks. Track(s) 504 can include, but are not limited to, those shown in FIG. 6. More specifically, the tracks of the railyard 502 can include main tracks 600, 632, inbound tracks 602-610, and outbound tracks 622-630. Load/unload areas 612-620 can be designated on the inbound tracks 602-610 and/or outbound tracks 622-630.

During operation, a railway asset 506 enters the railyard 502 via main track 600. In some scenarios, the railway asset comprises a railcar 542 that may be part of a train consist 540. The train consist 540 comprises a plurality of railcars coupled to each other. The train consist 540 can include, but is not limited to, the locomotive 120. The train consist is decoupled and disassembled on the main track 600 into individual railcars 542. Railcars 542 can include, but are not limited to, railcar 102 of FIG. 1. The individual railcars are then moved to one or more of the inbound tracks 602-610, for example, based on their classifications and/or train consist reassembly sequences.

While on the track(s), individual(s) 514 inspect the railcars 542 using virtual reality device(s) 508. Individual(s) 514 can include, but is(are) not limited to, individual(s) 104 of FIG. 1. The virtual reality device(s) 508 can comprise MCD 106 of FIG. 1. The virtual reality device(s) 508 may include, but is(are) not limited to, virtual reality headset(s) (e.g., Microsoft Hololens), smart glasses implementing a mixed reality platform, and/or other devices implementing mixed reality platforms (e.g., an electric transportation device (e.g., a Segway®) with a transparent screen in the form of a windshield).

Virtual reality headsets and smart glasses are well known. It should be understood that the virtual reality headsets and smart glasses include transparent screens in the form of lenses for an augmented reality experience. The individual(s) 514 is(are) able to experience 2D and/or 3D holographic image(s) as though they are part of the real world railyard environment. The 2D and/or 3D holographic image data is integrated with real world data, and displayed to the individual(s) via one or more transparent screens. The 2D and/or 3D holographic image data can include, but is not limited to, railyard map information, railcar information, life-cycle analysis information, inspection information, maintenance scheduling information, requirement compliance information, and/or security check information.

In some scenarios, the virtual reality device(s) 508 is(are) used to automate (i) railyard map updates with railcar locations by track and railcar status, (ii) maintenance inspections, and/or (iii) maintenance scheduling. The automated inspections can include, but are not limited to, wheelset inspections, hand brake inspections, piston pin travel inspections, spring nest inspections, bearing inspections, and/or railcar body appliance inspections. For example, the virtual reality device(s) 508 is(are) used to: (i) detect whether or not handbrakes of the railcar(s) are set before loading/unloading operations are started in the load/unload areas 612-620; (ii) detect whether or not tank cars wheels are chocked before loading/unloading operations are started in the load/unload areas 612-620; (iii) detect any damage to the railcar (e.g., a crack in a wheelset, a car body, etc.); and/or (iv) detect whether or not a valve or manway is closed and locked after completion of loading/unloading operations. The present solution is not limited to the particulars of this example.

The virtual reality device(s) 508 may also be used to verify government requirements, shipping requirements, and/or customer requirements are met. For example, the virtual reality device(s) 508 may be used to verify that tank capacities match loading tickets, verify product quantities, verify product qualities, ensure place cards and identification numbers are legible and correct, verify special permit numbers are marked on railway assets, verify that proper shipping names are marked on railway assets, verify that inhalation hazards are marked on railway assets, and/or verify certain decals are present on railway assets.

The virtual reality device(s) 508 may further be used to automate security checks of the containers and/or report any unusual conditions. The containers can include, but are not limited to, shipping containers, ISO containers, and/or any other freight transport item that forms part of and/or can be loaded onto a railcar or other railway asset. The unusual conditions can include, but are not limited to, missing or broken security seals, defective ladders, defective handles, defective handrails, defective tank shells, defective jacket heads, defective double shelf couplers, defective Automatic Equipment Identification (AEI) tags, defective axles, defective wheels, and/or the presence of suspicious packages on or adjacent to the railway assets.

The information collected by the virtual reality device(s) 508 can be used by a machine learning algorithm to make predictions of future events relating to the railway asset. For example, the machine learning algorithm can process information specifying current conditions of components of a railcar 542 to detect patterns which have been machine learned to lead to a particular event with a certain degree of likelihood or probability (e.g., a hairline crack in a wheel can lead to a derailment of the railcar with a certain degree of likelihood or probability that exceeds a threshold value, or an offset in a bracket position relative to a given reference point can lead to a mechanical failure of an axle with a certain degree of likelihood or probability that exceeds a threshold value). The present solution is not limited to the particulars of this example. The machine learning algorithm can be performed by one or more of the devices 508, 510, 528, 530 of FIG. 5.

The machine-learning algorithm(s) can employ supervised machine learning, semi-supervised machine learning, unsupervised machine learning, and/or reinforcement machine learning. Each of these listed types of machine-learning algorithms is well known in the art. In some scenarios, the machine-learning algorithm includes, but is not limited to, a decision tree learning algorithm, an association rule learning algorithm, an artificial neural network learning algorithm, a deep learning algorithm, an inductive logic programming based algorithm, a support vector machine based algorithm, a Bayesian network based algorithm, a representation learning algorithm, a similarity and metric learning algorithm, a sparse dictionary learning algorithm, a genetic algorithm, a rule-based machine-learning algorithm, and/or a learning classifier system based algorithm. The machine-learning process implemented by the present solution can be built using Commercial-Off-The-Shelf (COTS) tools (e.g., SAS available from SAS Institute Inc. of Cary, N.C.).

The virtual reality device(s) 508 are configured to communicate with external device(s) 510 via wireless communications for facilitating the automation of the above described processes/tasks. For example, the virtual reality device(s) 508 is(are) configured to communicate with communication device(s) 510 via wireless communication links 512, 516/520, 522/526. The communication device(s) 510 can include, but is(are) not limited to, gateways, mobile devices (e.g., radios, tablets, smart phones, etc.), and/or other devices. The wireless communications can include, but are not limited to, satellite communications, LRCs (e.g., cellular communications and/or WiFi communications) and/or SRCs (e.g., Bluetooth).

The virtual reality device(s) 508 is(are) also configured to communicate with remote server(s) 528 via network 524 (e.g., an Intranet or Internet). Remote server can include, but is not limited to, server 110 of FIG. 1. Network 524 can include, but is not limited to, network 108 of FIG. 1. The remote server(s) 528 is(are) configured to (i) facilitate access to and storage of data 534 in datastore 532 (e.g., a database), and/or (ii) facilitate the provision of notifications and/or alerts to computing device(s) 530 (e.g., of site supervisors or managers). Datastore 532 can include, but is not limited to, datastore 112 of FIG. 1. The notifications and/or alerts can concern detected defects of railway assets, maintenance scheduling for railway assets, locations of railway assets, statuses of railway assets, detected unusual activity in railyards, inspection statuses, inspection results, security check statuses, security check results, and/or requirement satisfaction/compliance. The remote server(s) 528 can use this information to update railyard maps and/or railyard GUIs in real time or near real time (e.g., as the railyard inspection(s) is(are) being performed). Illustrative GUIs are shown in FIGS. 10-12 and 15-18.

In some scenarios, the information acquired by the virtual reality device(s) 508 can also be used to facilitate the inspection and interaction with real-world railway assets in real-time or near real-time using virtual reality technology by individual(s) 556 (e.g., mechanics) located at a site 550 remote from the railyard 502. For example, a computing device 530 obtains a digital 3D model of the real-world railyard environment including railway asset(s) and/or robotic manipulator(s) 536 from the datastore 532 via server 528. Robotic manipulator(s) are well known (e.g., an articulating or telescoping arm with a gripper at a free end). A video is generated by a camera of the virtual reality device(s) 508 and/or other camera 538 placed in the railyard 502, and streamed to the computing device 530. The computing device 530 uses the video's content to convert the digital 3D model into another digital 3D model representative of the current locations, positions and/or orientations of the real-world railway asset(s) and robotic manipulator(s). The individual 556 is then provided with a real-time or near real-time virtual reality experience with the real-world railway asset(s) and robotic manipulator(s) by displaying the digital 3D model in a virtual reality environment 554. The individual 556 can cause movement of the robotic manipulator(s) in the railyard 502 via user-software interactions for interacting the with digital 3D model while the individual is having the real-time or near real-time virtual reality experience at site 550. In this way, maintenance of a railway asset can be achieved through the remote control of the robotic manipulator(s) via virtual reality technology.

Figure 6:
FIG. 6 provides an illustration of an illustrative track arrangement of a railyard.

Once the inspection and safety check is completed, the railcar 542 is moved to an outbound track (e.g., outbound track 622 of FIG. 6). The railcar 542 is then moved to the main track 632 in accordance with a train consist reassembly sequence. The train consist may then be assembled, verified by the virtual reality device(s) 508, and leave the railyard 502 via main track 632.

Virtual reality device(s) 508, communication device(s) 510, server(s) 528 and/or computing device(s) 530 of FIG. 5 is(are) the same as or substantially similar to communication device 200 of FIG. 2 and/or computing device 300 of FIG. 3. The above discussion of device(s) 200, 300 is(are) sufficient for understanding device(s) 508, 510, 528, 530 of FIG. 5. Still, it should be noted that display 354 can include a VR display apparatus, and the hardware entities 214 can include an electronic circuit (e.g., a processor) programmed for facilitating the provision of AR based railyard management and/or a VR environment in which a visual experience with the real-world railyard assets/structures can be simulated in real-time or near real-time. The electronic circuit can access and run software application(s) that is(are) installed on the device 200, 300 and generally operative to facilitate automation of the following tasks, but not limited to: validating train consists, validating information and/or markings on railway assets, detecting/tracking locations of railway assets in railyards, updating railyard maps, monitoring states of the railway assets while in the railyards, detecting damage to railway assets in the railyards, detecting hazards of railway assets, predicting future issues with railway assets based on machine learned information (e.g., a predicted derailment of a railcar based on detected state(s) of components thereof (e.g., a detected crack or other mechanical fault in a wheel, axle, bearing, etc.)), performing maintenance checks for various components of the railway assets (e.g., wheels, axles, bearings, appliances, ladders, etc.), scheduling maintenance for the railway assets, facilitating maintenance of railway assets using robotic manipulator(s) (e.g., articulating arms) which are remotely controlled via a VR environment, performing security checks, performing compliance checks (e.g., regulatory, shipping, customer, etc.), and providing alerts/notifications to relevant parties/individuals. Other functions of the these software application(s) are apparent from the present disclosure and drawings. Such other functions can relate to remote control of moving parts in a railyard (e.g., robotic manipulator(s) 536 of FIG. 5) and/or operational parameters. The software application(s) is(are) operative to access parameter(s)/requirement(s) stored in memory of the device 200, 300 and/or data (e.g., data 534 of FIG. 5) stored in a remote datastore (e.g., datastore 532 of FIG. 5).

Figure 7:
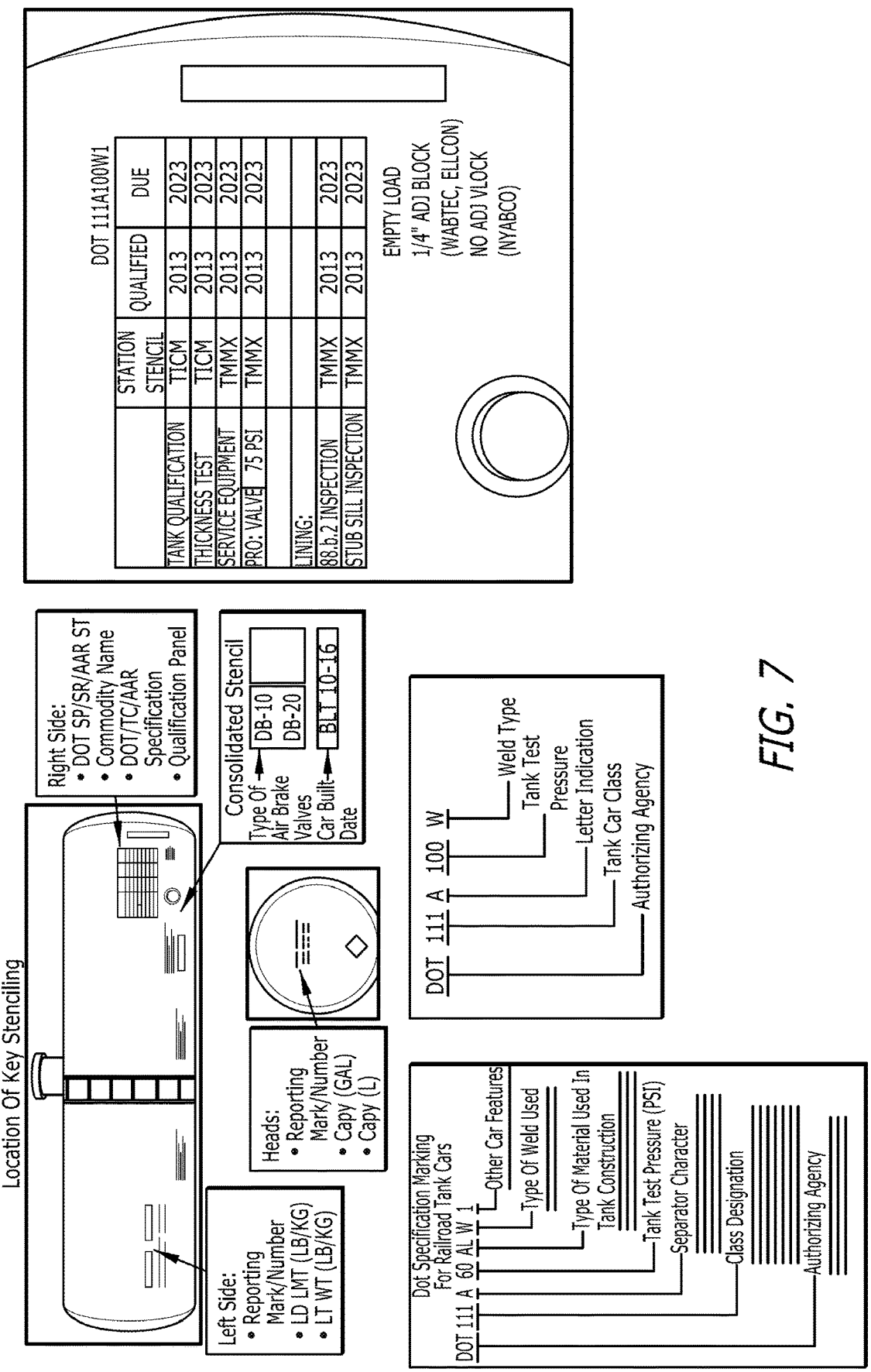
FIGS. 7 and 8 provide illustrations that are useful for understanding information, marking and decals of a railcar.
Figure 8:
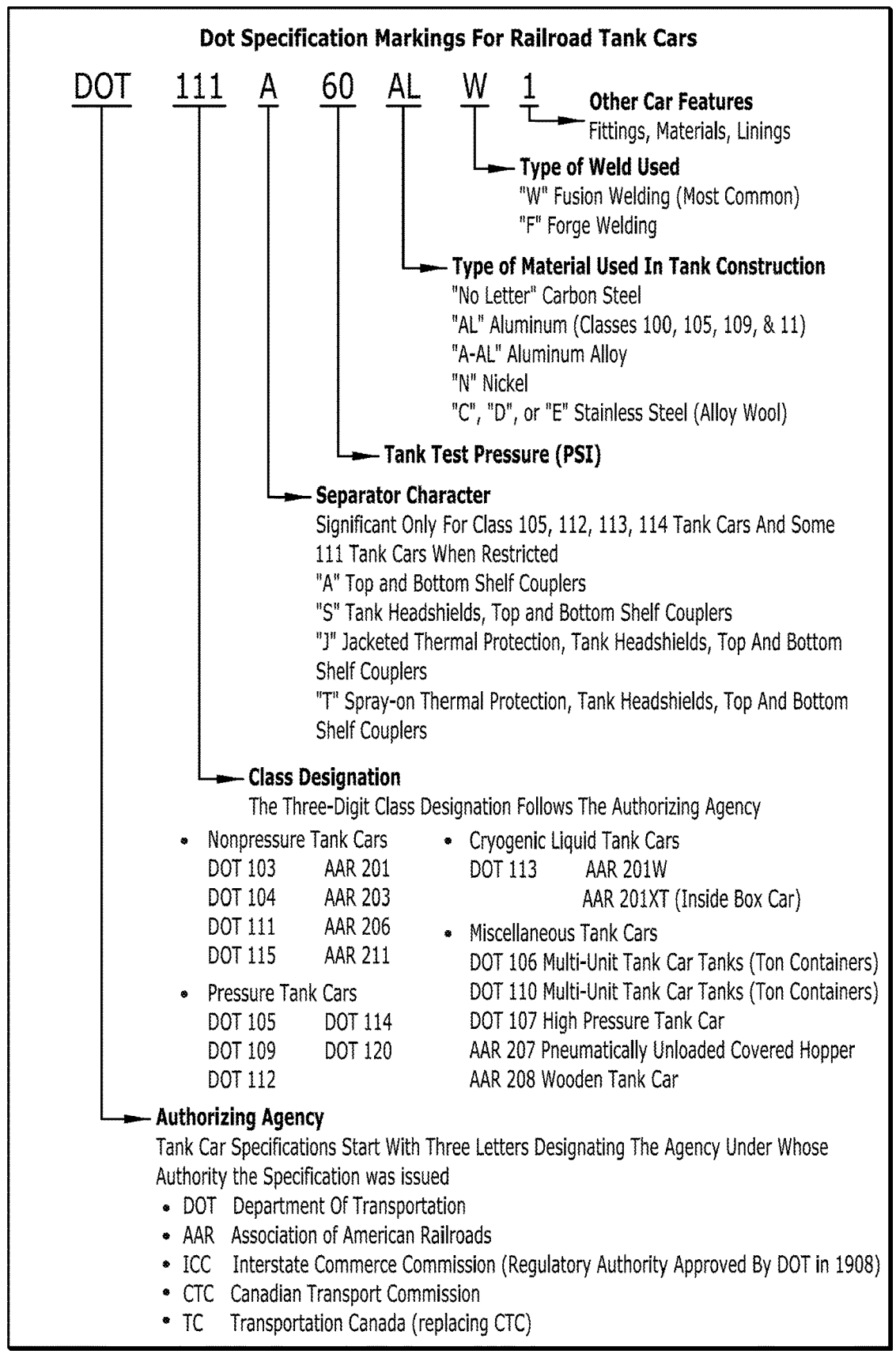

FIGS. 7-8 provide illustrations that are useful for understanding the types and locations of information, markings and decals printed or otherwise disposed on a railway asset (e.g., railcar 102 of FIG. 5 and/or railcar 542 of FIG. 5). The types and locations of information, markings and decals that can be used in conjunction with the present solution are not limited to that shown in FIGS. 7-8. Also, the information included in FIGS. 7-8 may change in accordance with industry standards and railway asset type.

Markings specifying the following information may be printed or otherwise disposed on the railway asset at respective locations: a leasing company identifier; a railway asset number, an authorizing agency identifier (e.g., Department of Transportation (DOT), Association of American Railroads (AAR), and/or Transport Canada (TC)); a class designation (e.g., non-pressure tank cars, cryogenic liquid tank cars, pressure tank car, multi-unit tank car (containers), high pressure tank car, pneumatically unloaded covered hoppers, and/or wooden tank car); separator character (e.g., top and bottom shelf couplers, tank headshields, jacketed thermal protection, and/or spray-on thermal protection); tank test pressure; material type used in tank construction (e.g., carbon steel, aluminum, aluminum alloy, nickel, and/or stainless steel alloy); type of weld (e.g., fusion weld or forge weld); and/or other car features (e.g., fittings, materials, linings).

The AR/VR application(s) (e.g., applications 322 of FIG. 3) are operative to recognize such markings on railway assets based on images and/or videos captured by VR device(s) (e.g., MCD 106 of FIG. and/or VR device(s) 508 of FIG. 5), and perform automated railyard management operations/tasks using content of the recognized markings. For example, the AR/VR application(s) may cause a railyard map to be updated to include an icon representing a given railcar and showing a current location of a railcar in the railyard. Content of the recognized markings and/or collected railcar status information can be superimposed on the railyard map or otherwise displayed on a screen in response to a user-software action for selecting the icon. The present solution is not limited in this regard.

Figure 9:
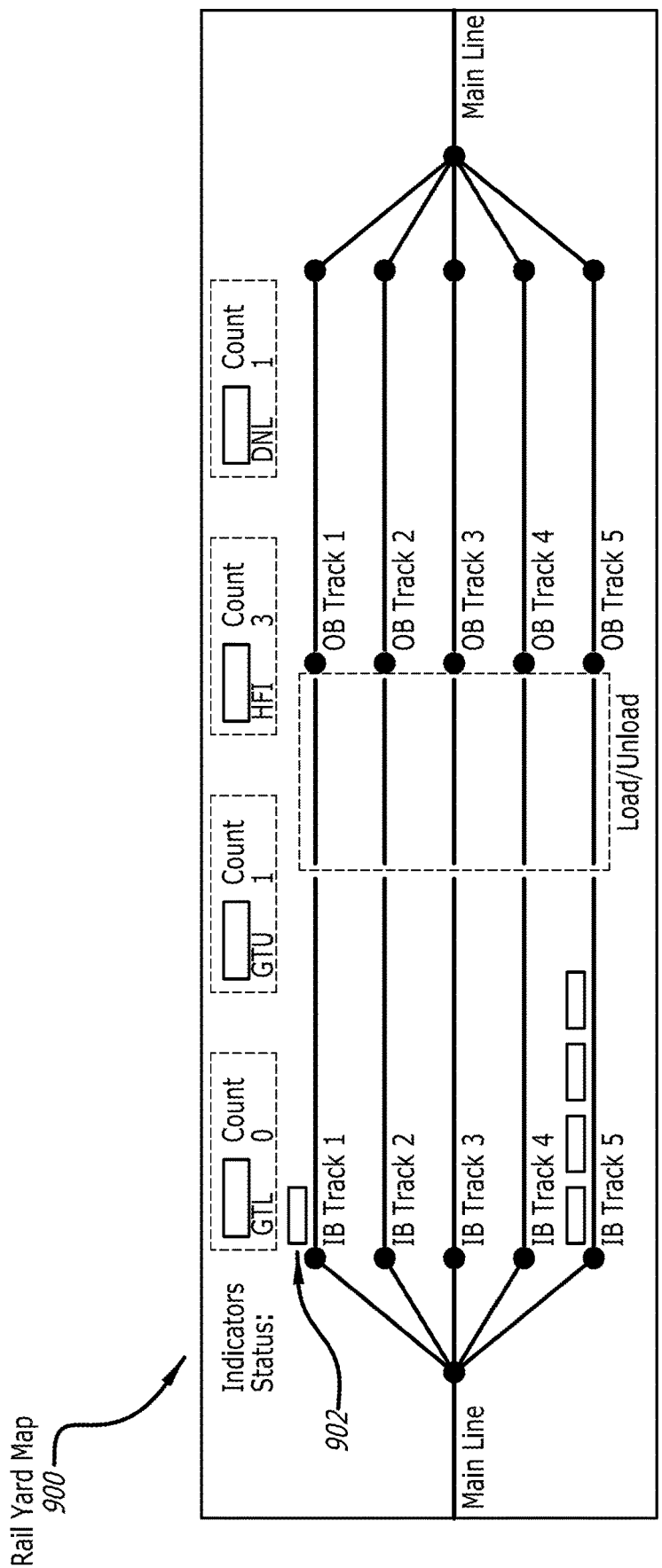
FIG. 9 provides an illustration of an illustrative railyard map.
Figure 10:
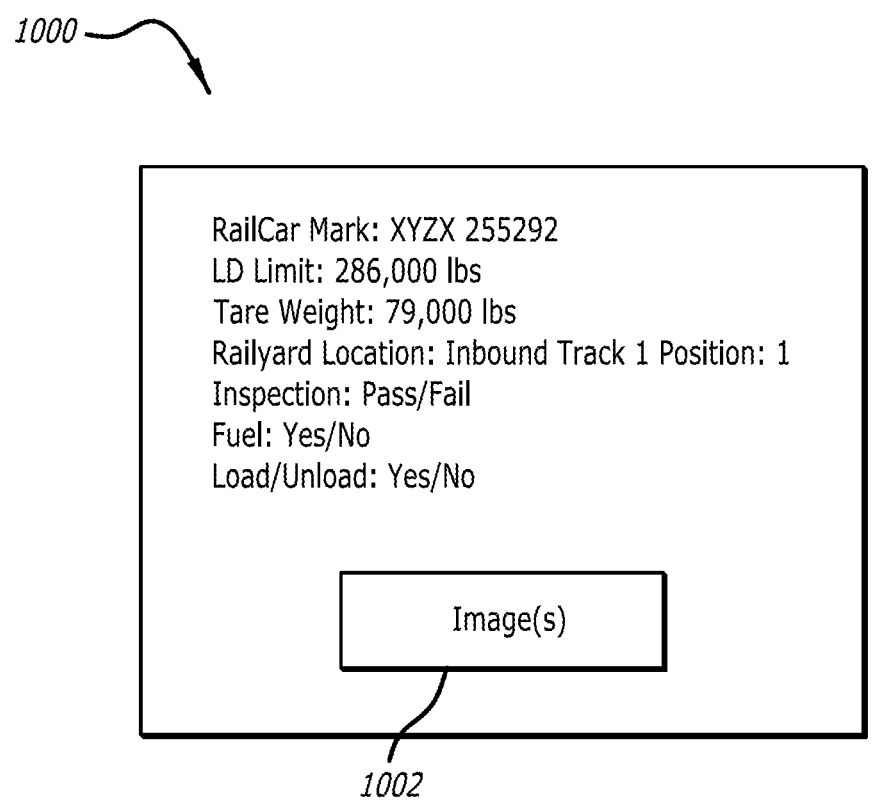
Figure 12:
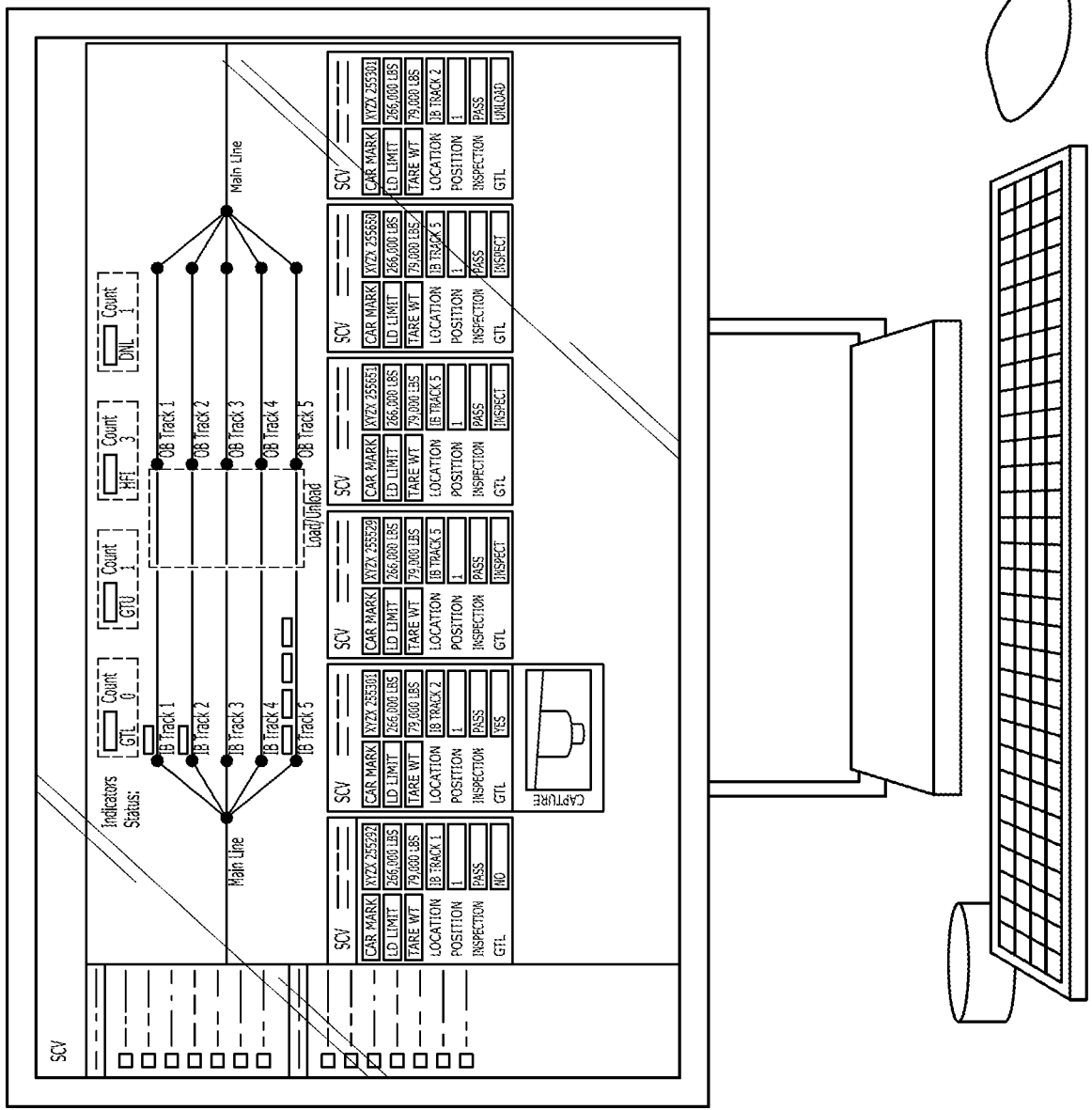
Figure 13:
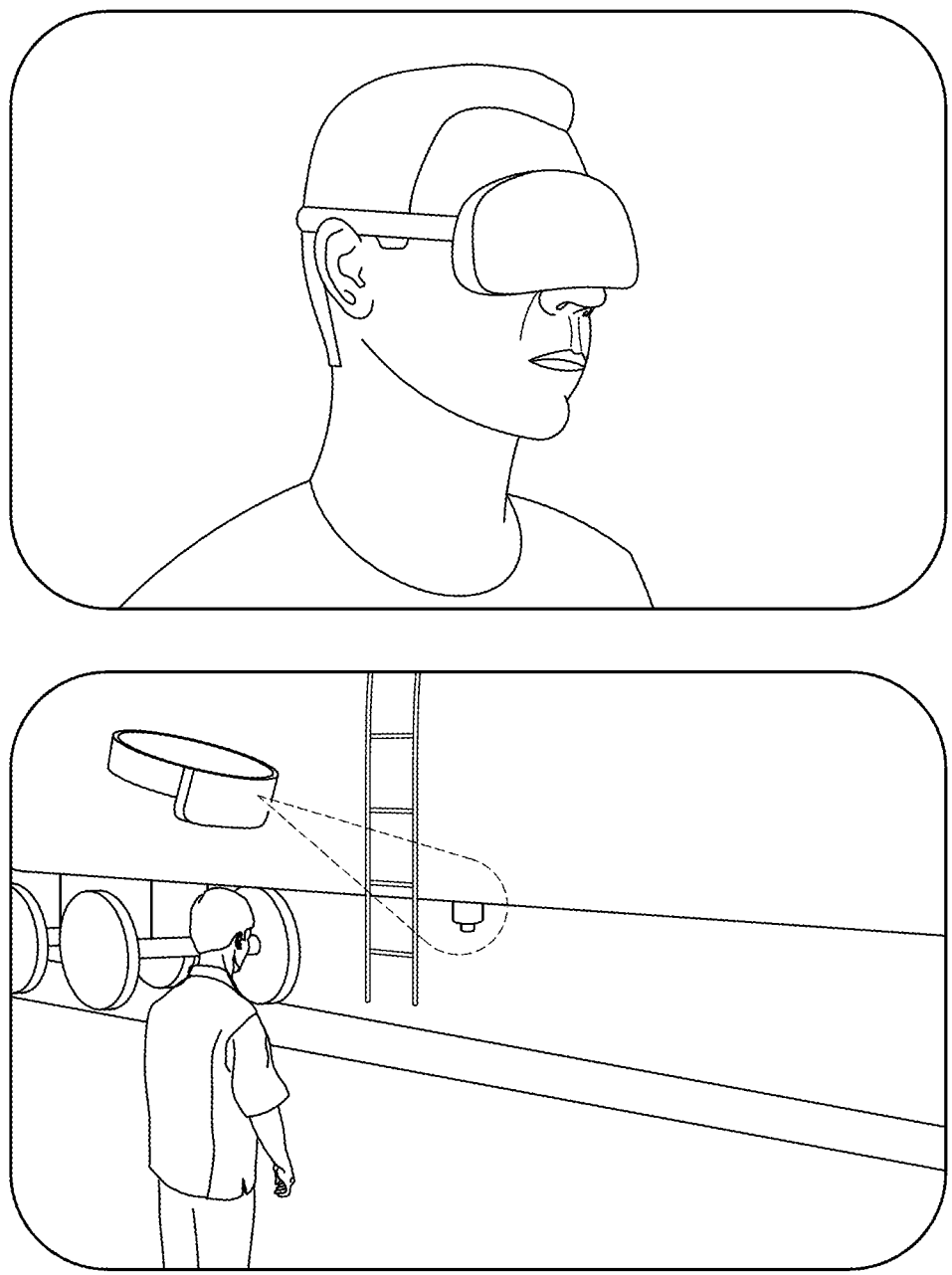
FIG. 13 provides an illustration that is useful for understanding automated maintenance inspections of the present solution.
Figure 14:
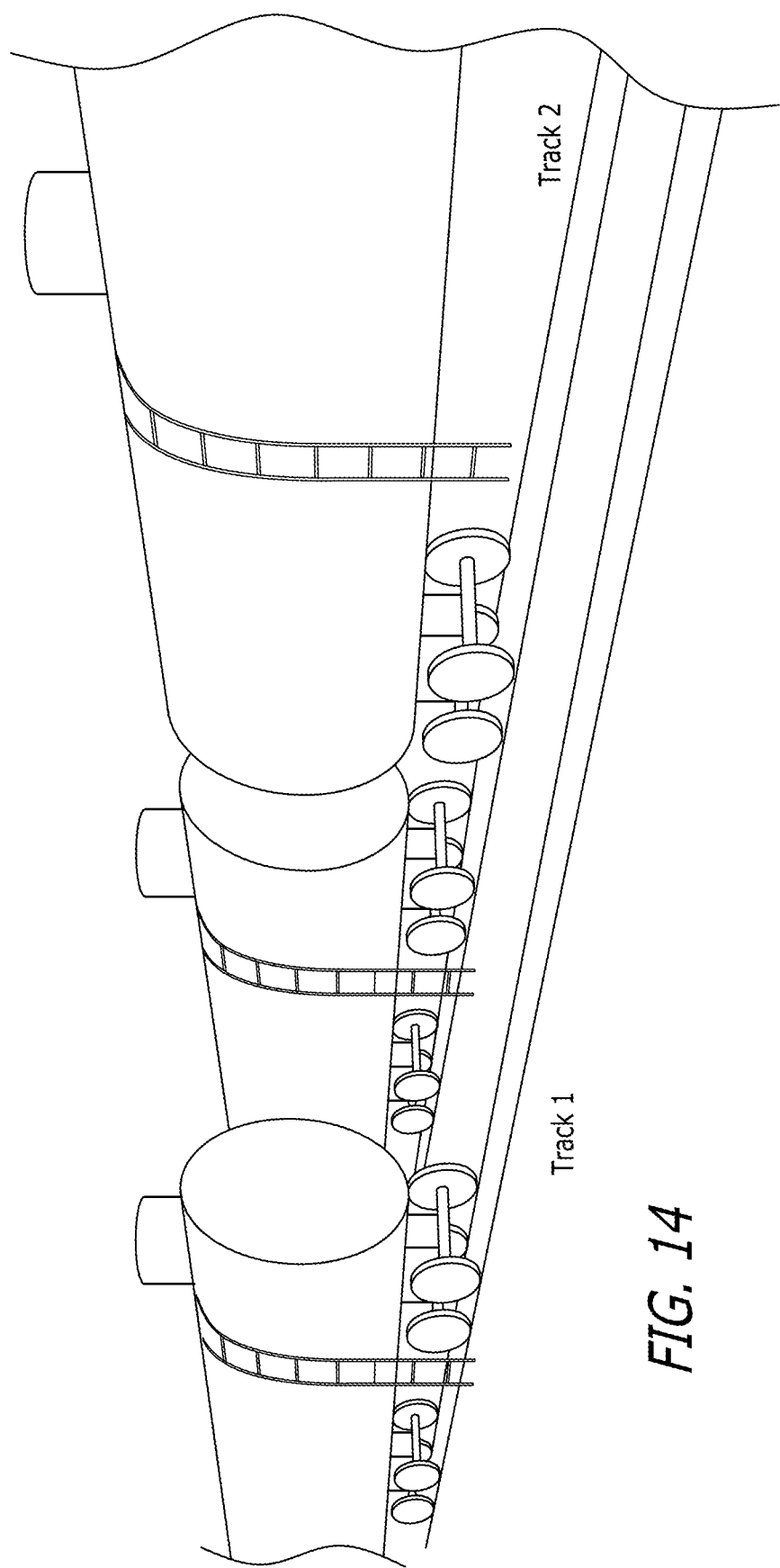
FIG. 14 provides an illustration showing railcars on a plurality of tracks in a railyard.
Figure 15:
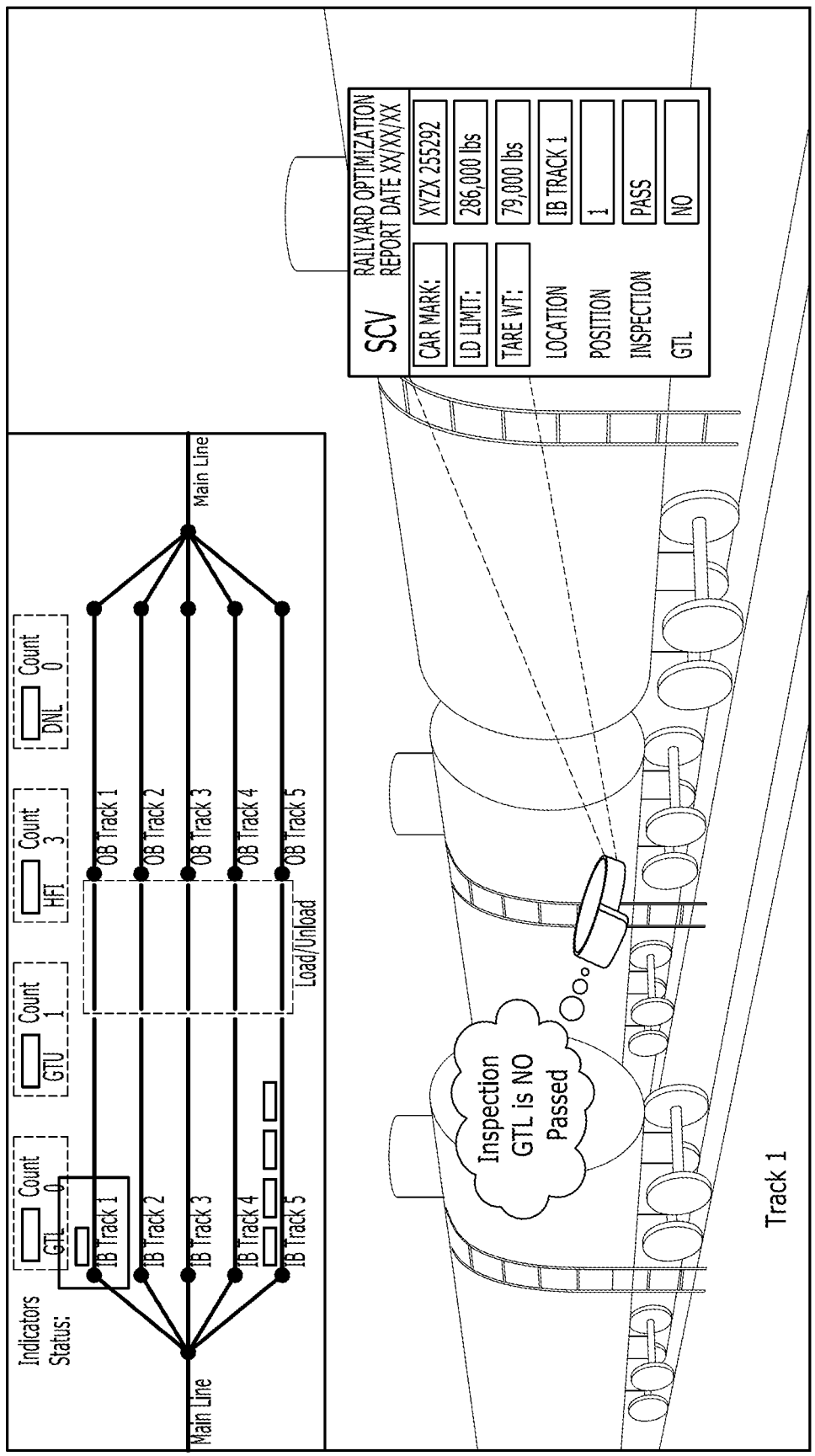
FIGS. 15-18 each provides an illustration of an illustrative GUI.
Figure 16:
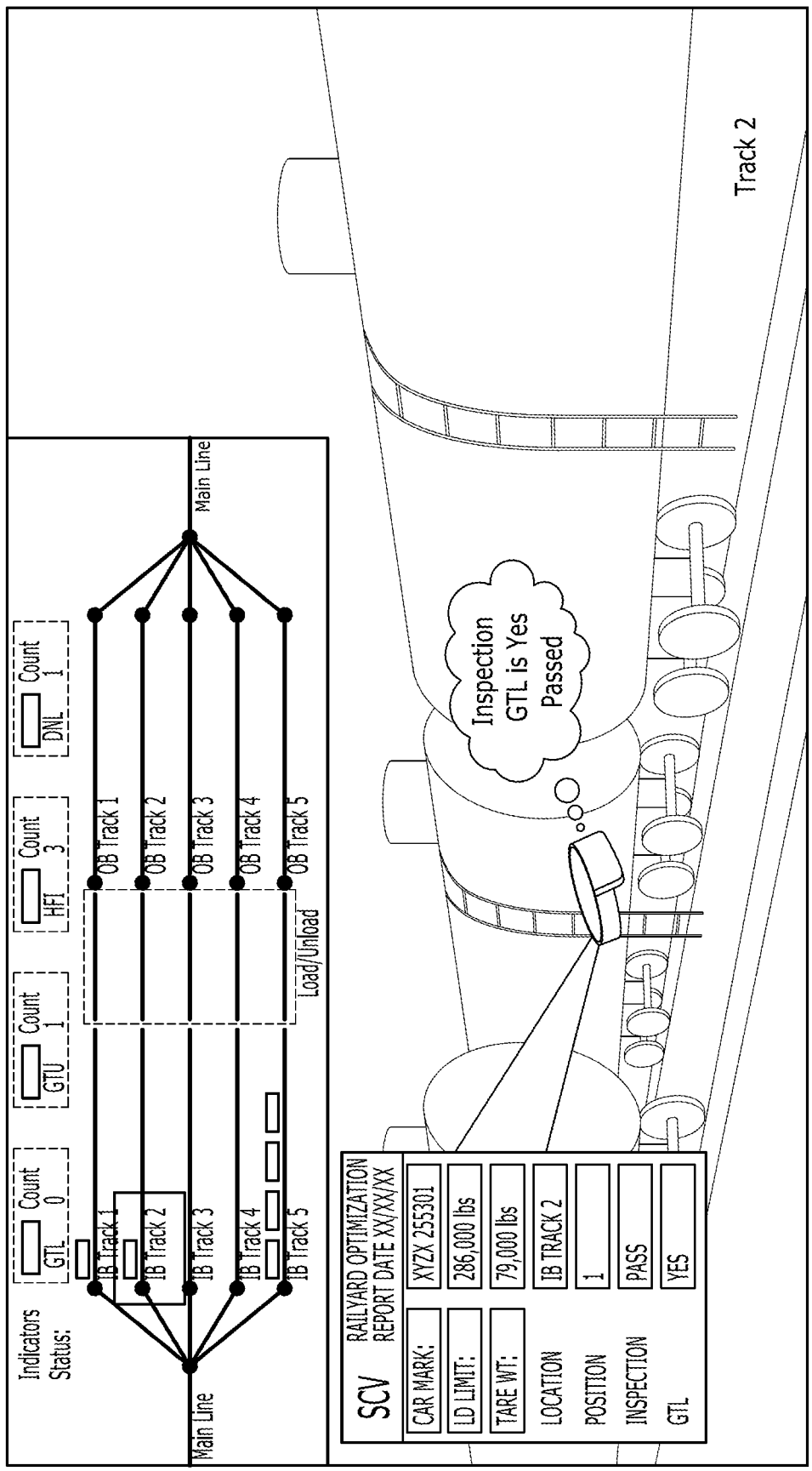
Figure 17:
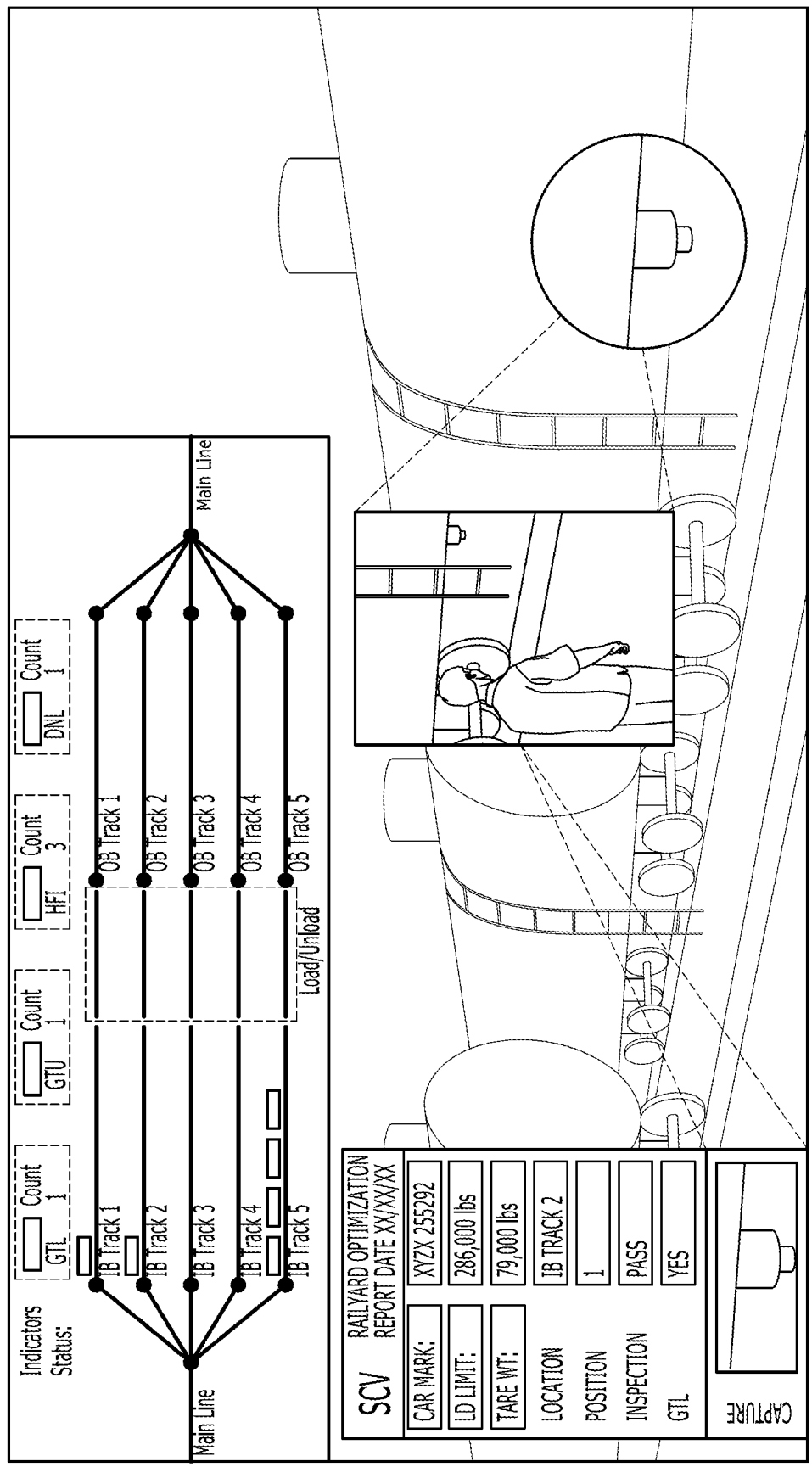
Figure 18:
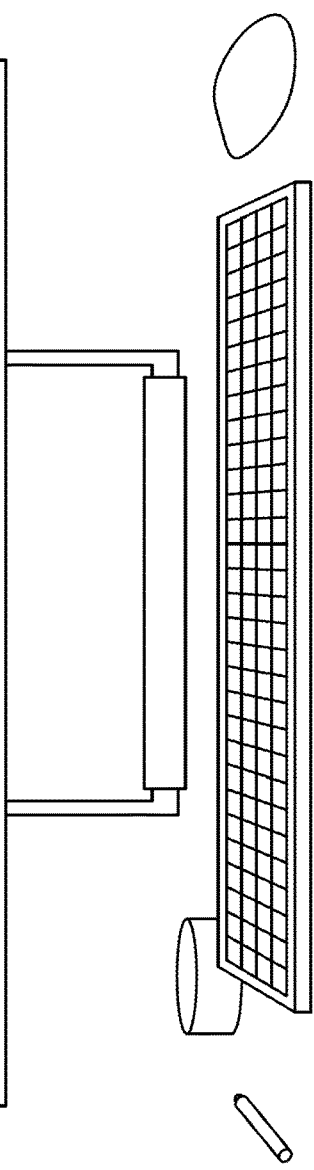

An illustrative railyard map 900 is shown in FIG. 9. The railyard map 900 comprises railcar icons 902 arranged to show current locations of railcars on tracks of the railyard and to show relative positions (or sequenced order) of railcars on each track. An illustrative window 1000 showing content of recognized markings (e.g., railcar mark, LD limit, and tare weight), railcar location/position information (e.g., track 1, position 1), and collected railcar status information (e.g., passed/failed inspection, was/was not unloaded/loaded) is provided in FIG. 10.

Figure 19:
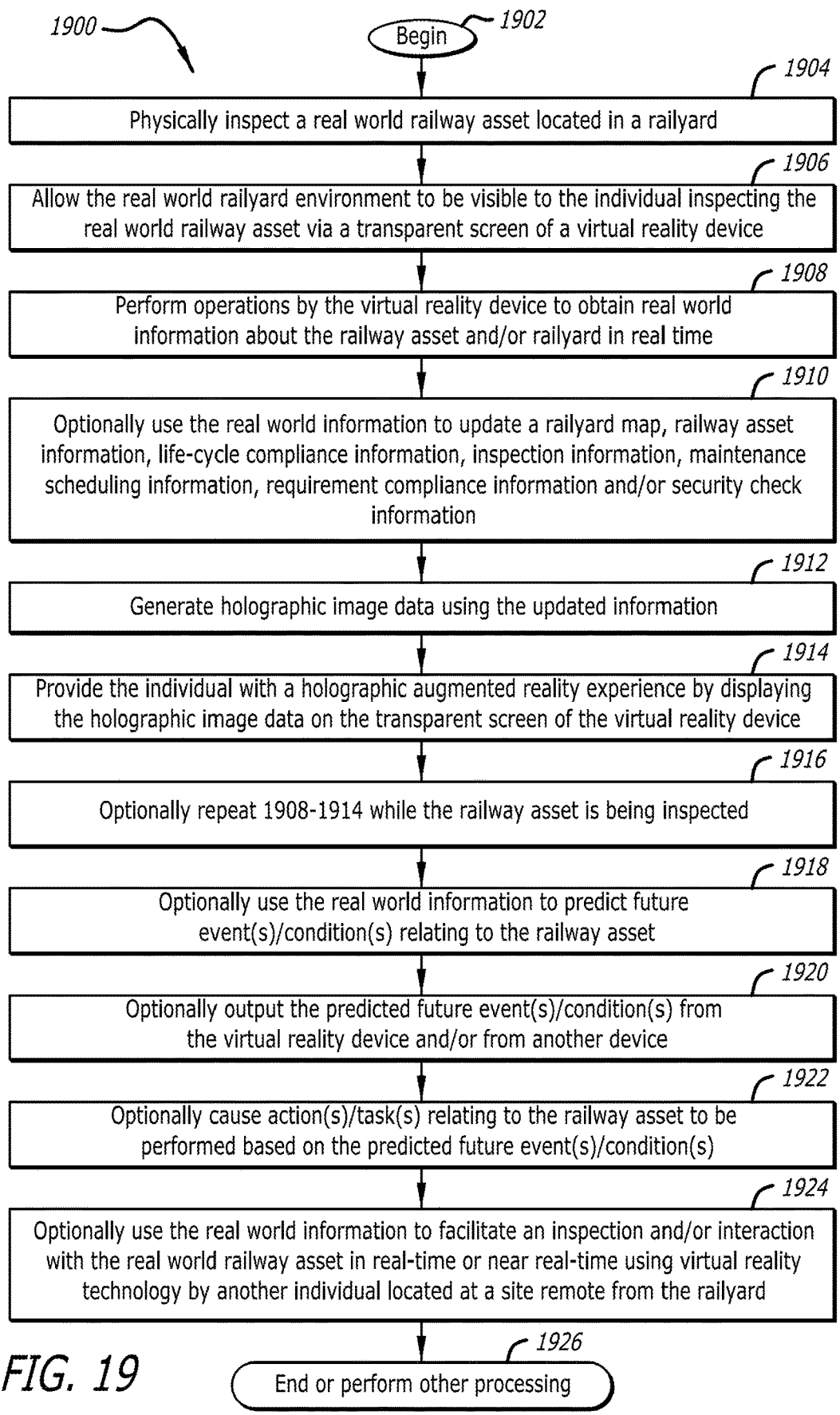
FIG. 19 provides a flow diagram of an illustrative method for railyard management.

Referring now to FIG. 19, there is provided a flow diagram of an illustrative method 1900 for AR based railyard management. Method 1900 begins with 1902 and continues with 1904 where an individual (e.g., individual 104 of FIG. 1 and/or 514 of FIG. 5) physically inspects a real world railway asset (e.g., train consist 504 of FIG. 5 and/or railcar 542 of FIG. 5). During the inspection, the real world railyard environment is visible to the individual via a transparent screen of a virtual reality device (e.g., MCD 106 of FIG. 1 and/or virtual reality device 508 of FIG. 5), as shown by 1906.

In 1908, the virtual reality device performs operations to obtain real world information about the railway asset and/or railyard (e.g., railyard 502 of FIG. 5) in real time. This information can be obtained using a camera (e.g., camera 218 of FIG. 2) and/or other sensor(s) (e.g., sensor(s) 262 of FIG. 2) of the virtual reality device. Additionally or alternatively, the information can be obtained via wireless communications between the virtual reality device and a data collection unit 118 installed or being installed on the railway asset. The information can include, but is not limited to, information disposed on the railway asset(s) (e.g., railcar mark(s)), tare weight(s), maximum weight(s), certification reference number(s), certification date(s), data collected from sensors installed on the railcar (e.g., commodity temperature sensor data, hatch status data, bearing temperature data, and/or load status data), railcar/locomotive component data (e.g., make, model, serial number, wheel size, etc.), maintenance information (e.g., date/time of last maintenance and/or type of maintenance performed), location of railway asset, and/or information indicating state(s) and/or condition(s) of the railway asset and/or component(s) thereof. The state(s)/condition(s) can include, but are not limited to, satisfactory mechanical state(s)/condition(s) (e.g., the railway asset has properly operating brakes, hatches, discharge gates, ports, doors, valves, ports, manways, etc.), mechanical fault state(s)/condition(s) (e.g., defective brakes, hatches, discharge gates, doors, valves, ports and/or manways to present proper operation), satisfactory physical state(s)/condition(s) (e.g., absent of dents, cracks, holes, wear, etc.), damaged state(s)/condition(s) (e.g., presence of dents, cracks, holes, wear, etc.), safe state(s)/condition(s) (e.g., hatches, discharge gates, ports, doors, valves, ports, manways, etc. are properly sealed, closed and/or latched), unsafe state(s)/condition(s) (e.g., hatches, discharge gates, ports, doors, valves, ports, manways, etc. are not sealed, are open and/or are unlatched), and/or hazardous state(s)/condition(s) (e.g., a particular type and/or amount of smell/scent detected outside of railway asset, and/or a tripping or fall hazard exists, for example, due to a broken or missing rung on a ladder).

In optional 1910, the real world information is used to, but not limited to, update a railway map (e.g., railyard map 900 of FIG. 9), railway asset information (e.g., information shown in FIGS. 7-8), life cycle compliance information, inspection information, maintenance scheduling information, requirement compliance information (e.g., government and/or customer), and/or security check information. This operation can be performed by the virtual reality device and/or another device (e.g., server 110 of FIG. 1, computing device 116 of FIG. 1, communication device 510 of FIG. 5, server 528 of FIG. 5, and/or communication device 530 of FIG. 5) that is communicatively coupled to the virtual reality device. The updated information can be stored in a datastore (e.g., datastore 112 of FIG. 1, memory 212 of FIG. 2, memory 312 of FIG. 3 and/or datastore 532 of FIG. 5).

In 1912, holographic image data is generated using the updated information. The holographic image data is then displayed on the transparent screen of the virtual reality device so that the individual is provided with a holographic AR experience, as shown by 1914. The operations of 1908-1914 may be repeated a number of times while the railway asset is being inspected, as shown by 1916.

The real world information may optionally be used in 1918 to predict future event(s) and/or condition(s) relating to the railway asset. The prediction can be made using machine learning algorithms. The machine learning algorithms can, for example, be trained to predict derailment of a railcar based on detected state(s) of components thereof (e.g., a detected crack or other mechanical fault in a wheel, axle, etc.), and/or predict component failure (e.g., based on life expectancy thereof, component type, duration of use, and/or amount of wear/tear from use). The predicted future event(s) and/or condition(s) may optionally be output from the virtual reality device and/or from another device, as shown by 1920. In 1922, the predicted future event(s) and/or condition(s) may be used to cause action(s) and/or task(s) to be taken which relate to the railway asset. For example, a part for the railway asset can be ordered and/or maintenance of the railway asset can be scheduled. Additionally or alternatively, an adjustment to the amount of load in/on the railyard asset is caused and/or a temporary removal of the railway asset from use is caused. The present solution is not limited to the particulars of this example.

In 1924, the real world information may optionally be used to facilitate an inspection and/or interaction with the real world railway asset in real-time or near real-time using virtual reality technology by another individual (e.g., individual 556 of FIG. 5) located at a site (e.g., site 550 of FIG. 5) remote from the railyard.

For example, a computing device at the remote site obtains a digital 3D model of the real-world railyard environment including railway asset(s) and/or robotic manipulator(s) from the datastore via a server. A video is generated by a camera of the virtual reality device and/or other camera placed in the railyard, and streamed to the computing device. The computing device uses the video's content to convert the digital 3D model into another digital 3D model representative of the current locations, positions and/or orientations of the real-world railway asset and a robotic manipulator (e.g., robotic manipulator 536 of FIG. 5). The individual is then provided with a real-time virtual reality experience with the real-world railway asset and robotic manipulator by displaying the digital 3D model in a virtual reality environment. The individual can cause movement of the robotic manipulator in the railyard via user-software interactions for interacting the with digital 3D model while the individual is having the real-time virtual reality experience at the remote site. In this way, maintenance of a railway asset can be achieved through the remote control of the robotic manipulator(s) via virtual reality technology. Subsequently, 1926 is performed where method 1900 ends or other operations are performed (e.g., return to 1902).

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for Augmented Reality (AR) based railyard management, comprising:
    obtaining real world information collected by a computing device about railway assets located in a railyard;
    processing the real world information to recognize a marking on at least one of the railway assets;
    generating holographic image data based on content of the recognized marking;
    providing an individual with an augmented reality experience by overlaying the holographic image data on a visible real world environment; and
    using the content of the recognized marking to facilitate automated railyard management tasks.

2. The method according to claim 1, wherein the railway asset comprises a train consist, a railcar, a locomotive, a rail maintenance equipment, a container, or an International Standards Organization (ISO) tank.

3. The method according to claim 1, wherein the automated railyard management tasks comprises at least one of validating a train consist, validating information disposed on the railway assets, detecting locations of the railway assets in the railyard, updating a map of the railyard, monitoring states of the railway assets while in the railyards, detecting damage to the railway assets in the railyards, detecting hazards of the railway assets, predicting future issues with the railway assets based on machine learned information, performing maintenance checks for components of the railway assets, scheduling maintenance for the railway assets, facilitating maintenance of railway assets using a robotic manipulator which is remotely controlled via a virtual reality environment, performing security checks for the railyard, performing security checks for the railway assets, performing compliance checks for the railway assets, and providing notifications to individuals.

4. The method according to claim 1, wherein the augmented reality experience is provided to the individual by allowing a real world environment of the railyard to be visible to an individual who is wearing the computing device.

5. The method according to claim 1, wherein the real world information comprises at least one of locations of the railway assets, information disposed on the railway assets, physical conditions of the railway assets, operating states of components of the railway assets, and physical conditions of the components of the railway assets.

6. The method according to claim 1, further comprising performing a machine learning algorithm using the real world information to predict a future event or condition relating to at least one railway asset of the railway assets.

7. The method according to claim 6, further comprising causing an action to be taken in relation to the railway asset based on the predicted future event or condition.

8. The method according to claim 1, further comprising using the real world information to facilitate an inspection of the railway assets by an individual remote from the railyard.

9. The method according to claim 1, further comprising using real world information to facilitate a remote control of a robotic manipulator located in the railyard.

10. A system, comprising:
a processor;
a non-transitory computer-readable storage medium comprising programming instructions that are configured to cause the processor to implement a method for Augmented Reality (AR) based railyard management, wherein the programming instructions comprise instructions to:
obtain world information about railway assets located in a railyard;
process the real world information to recognize a marking on at least one of the railway assets;
generate holographic image data based on content of the recognized marking;
provide an individual with an augmented reality experience by overlaying the holographic image data on a visible real world environment; and
use the content of the recognized marking to facilitate automated railyard management tasks.

11. The system according to claim 10, wherein the railway asset comprises a train consist, a railcar, a locomotive, a rail maintenance equipment, a container, or an International Standards Organization (ISO) tank.

12. The system according to claim 10, wherein the automated railyard management tasks comprises at least one of validating a train consist, validating information disposed on the railway assets, detecting locations of the railway assets in the railyard, updating a map of the railyard, monitoring states of the railway assets while in the railyards, detecting damage to the railway assets in the railyards, detecting hazards of the railway assets, predicting future issues with the railway assets based on machine learned information, performing maintenance checks for components of the railway assets, scheduling maintenance for the railway assets, facilitating maintenance of railway assets using a robotic manipulator which is remotely controlled via a virtual reality environment, performing security checks for the railyard, performing security checks for the railway assets, performing compliance checks for the railway assets, and providing notifications to individuals.

13. The system according to claim 10, wherein the augmented reality experience is provided to the individual by allowing a real world environment of the railyard to be visible to an individual who is wearing the computing device.

14. The method according to claim 10, wherein the real world information comprises at least one of locations of the railway assets, information disposed on the railway assets, physical conditions of the railway assets, operating states of components of the railway assets, and physical conditions of the components of the railway assets.

15. The system according to claim 10, wherein the programming instructions further comprise instructions to perform a machine learning algorithm using the real world information to predict a future event or condition relating to at least one railway asset of the railway assets.

16. The system according to claim 15, wherein the programming instructions further comprise instructions to cause an action to be taken in relation to the railway asset based on the predicted future event or condition.

17. The system according to claim 10, wherein the programming instructions further comprise instructions to use the real world information to facilitate an inspection of the railway assets by an individual remote from the railyard.

18. The system according to claim 10, wherein the programming instructions further comprise instructions to use real world information to facilitate a remote control of a robotic manipulator located in the railyard.

* * * * *